United States Patent
Orttung et al.

(10) Patent No.: US 8,819,789 B2
(45) Date of Patent: Aug. 26, 2014

(54) METHOD AND SYSTEM FOR USING SOCIAL NETWORKS TO VERIFY ENTITY AFFILIATIONS AND IDENTITIES

(75) Inventors: Mark Orttung, Menlo Park, CA (US); Darren Linscott, San Jose, CA (US)

(73) Assignee: Bill.com, Inc., Palo Alto, CA (US)

(*) Notice: Subject to any disclaimer, the term of this patent is extended or adjusted under 35 U.S.C. 154(b) by 107 days.

(21) Appl. No.: 13/517,503

(22) Filed: Jun. 13, 2012

(65) Prior Publication Data
US 2013/0239185 A1 Sep. 12, 2013

Related U.S. Application Data

(60) Provisional application No. 61/608,068, filed on Mar. 7, 2012.

(51) Int. Cl.
 *G06F 21/00* (2013.01)
 *H04L 29/06* (2006.01)
 *G06F 21/40* (2013.01)

(52) U.S. Cl.
 CPC ............... *H04L 63/08* (2013.01); *G06F 21/40* (2013.01)
 USPC .............................. 726/5; 705/318; 705/319

(58) Field of Classification Search
 None
 See application file for complete search history.

(56) References Cited

U.S. PATENT DOCUMENTS

| | | | |
|---|---|---|---|
| 5,121,945 A | 6/1992 | Thomson et al. | |
| 5,558,232 A | 9/1996 | Stevens et al. | |
| 5,649,115 A | 7/1997 | Schrader et al. | |
| 5,810,173 A | 9/1998 | Stevens et al. | |
| 5,926,392 A | 7/1999 | York et al. | |
| 5,933,817 A | 8/1999 | Hucal | |
| 6,044,362 A | 3/2000 | Neely | |
| 6,058,380 A | 5/2000 | Anderson et al. | |
| 6,108,513 A | 8/2000 | Landa et al. | |
| 6,285,991 B1 | 9/2001 | Powar | |
| 6,292,789 B1 | 9/2001 | Schutzer | |
| 6,343,275 B1 | 1/2002 | Wong | |
| 6,360,951 B1 | 3/2002 | Swinehart | |
| 6,385,595 B1 | 5/2002 | Kolling et al. | |
| 6,408,284 B1 | 6/2002 | Hilt et al. | |
| 6,650,767 B2 | 11/2003 | Jones et al. | |
| 7,004,393 B2 | 2/2006 | Schum et al. | |
| 7,117,172 B1 | 10/2006 | Black | |

(Continued)

OTHER PUBLICATIONS

De Felice, A., "Rene Lacerte: Entrepreneur by Blood," Accounting Technology, Boston, Jan./Feb. 2008, p. 40, vol. 24, Issue 1.

(Continued)

*Primary Examiner* — Gilberto Barron, Jr.
*Assistant Examiner* — Devin Almeida
(74) *Attorney, Agent, or Firm* — Greenberg Traurig LLP

(57) ABSTRACT

Login credentials for at least one website, such as a social networking website, are received from a user purporting to act on behalf of an entity, for example, in the context of registering the entity with a system for electronic bill payment. Social data relating to the entity is retrieved from the websites using the login credentials. The social data comprises a plurality of social connections, each reflecting a respective relationship between the entity and a respective third party. A plurality of relevant social connections comprising at least a subset of the plurality of social connections is determined, each social connection of the plurality of relevant social connections reflecting a relationship to a respective third party that is deemed to be reliable. A reliability rating of the entity is then determined based on the plurality of relevant social connections.

18 Claims, 29 Drawing Sheets

(56) References Cited

U.S. PATENT DOCUMENTS

| | | |
|---|---|---|
| 7,177,828 B1 | 2/2007 | Land et al. |
| 7,317,823 B1 | 1/2008 | Price et al. |
| 7,472,090 B1 | 12/2008 | White |
| 7,512,564 B1 | 3/2009 | Geer |
| 7,515,697 B2 | 4/2009 | Eng et al. |
| 7,536,325 B2 | 5/2009 | Randell et al. |
| 7,606,766 B2 | 10/2009 | Anderson et al. |
| 7,637,423 B2 | 12/2009 | Meidell et al. |
| 7,637,427 B2 | 12/2009 | Weiss |
| 7,668,363 B2 | 2/2010 | Price et al. |
| 7,767,925 B2 | 8/2010 | DiBiaso et al. |
| 7,792,717 B1 | 9/2010 | Hankins et al. |
| 7,809,615 B2 | 10/2010 | Hui et al. |
| 7,809,616 B1 | 10/2010 | Orttung et al. |
| 7,881,962 B2 | 2/2011 | Mason |
| 8,036,987 B1 | 10/2011 | Grbac et al. |
| 8,045,784 B2 | 10/2011 | Price et al. |
| 8,160,959 B2 | 4/2012 | Rackley |
| 8,195,570 B1 | 6/2012 | Barron et al. |
| 8,311,874 B2 | 11/2012 | Gupta et al. |
| 8,315,900 B2 | 11/2012 | Schwarz et al. |
| 8,521,626 B1 | 8/2013 | Orttung et al. |
| 2002/0019808 A1 | 2/2002 | Sharma |
| 2002/0023029 A1 | 2/2002 | Denver |
| 2002/0111886 A1 | 8/2002 | Chenevich et al. |
| 2002/0111915 A1 | 8/2002 | Clemens et al. |
| 2002/0111916 A1 | 8/2002 | Coronna et al. |
| 2002/0128967 A1 | 9/2002 | Meyer et al. |
| 2002/0133441 A1 | 9/2002 | Tanaka |
| 2002/0143674 A1 | 10/2002 | Beckman |
| 2002/0143716 A1 | 10/2002 | Byrne et al. |
| 2002/0194127 A1 | 12/2002 | Randell et al. |
| 2003/0009420 A1 | 1/2003 | Jones |
| 2003/0033159 A1 | 2/2003 | Altomare |
| 2003/0036999 A1 | 2/2003 | Mirlas et al. |
| 2003/0055756 A1 | 3/2003 | Allan |
| 2003/0069933 A1 | 4/2003 | Lim et al. |
| 2003/0093414 A1 | 5/2003 | Litzow et al. |
| 2003/0126079 A1 | 7/2003 | Roberson et al. |
| 2003/0191701 A1 | 10/2003 | Haseltine et al. |
| 2003/0220855 A1 | 11/2003 | Lam et al. |
| 2003/0220875 A1 | 11/2003 | Lam et al. |
| 2003/0233321 A1 | 12/2003 | Scolini et al. |
| 2004/0015445 A1 | 1/2004 | Heaven et al. |
| 2004/0034594 A1 | 2/2004 | Thomas et al. |
| 2004/0064375 A1 | 4/2004 | Randell et al. |
| 2004/0078271 A1 | 4/2004 | Morano et al. |
| 2004/0098338 A1 | 5/2004 | Uehara et al. |
| 2004/0108382 A1 | 6/2004 | Schum et al. |
| 2004/0143547 A1 | 7/2004 | Mersky |
| 2004/0167823 A1 | 8/2004 | Neely et al. |
| 2004/0167853 A1 | 8/2004 | Sharma |
| 2004/0181493 A1 | 9/2004 | Cross et al. |
| 2004/0199427 A1 | 10/2004 | Van der Loo |
| 2004/0216010 A1 | 10/2004 | Muller |
| 2005/0060260 A1 | 3/2005 | Masuda et al. |
| 2005/0075978 A1 | 4/2005 | Leavitt et al. |
| 2005/0091132 A1 | 4/2005 | Phillips et al. |
| 2005/0102608 A1 | 5/2005 | Batres |
| 2005/0151999 A1 | 7/2005 | Inikori |
| 2006/0116956 A1 | 6/2006 | Leavitt et al. |
| 2006/0248573 A1* | 11/2006 | Pannu et al. ............... 726/1 |
| 2006/0282381 A1 | 12/2006 | Ritchie |
| 2007/0038564 A1 | 2/2007 | Leavitt et al. |
| 2007/0045930 A1 | 3/2007 | Hayduchok et al. |
| 2007/0067240 A1 | 3/2007 | George |
| 2007/0112674 A1 | 5/2007 | Jones |
| 2007/0208640 A1 | 9/2007 | Banasiak et al. |
| 2007/0260536 A1 | 11/2007 | Stone |
| 2007/0271160 A1 | 11/2007 | Stone et al. |
| 2007/0288364 A1 | 12/2007 | Gendler |
| 2008/0010199 A1 | 1/2008 | Allin et al. |
| 2008/0015982 A1 | 1/2008 | Sokolic et al. |
| 2008/0033851 A1 | 2/2008 | Williams et al. |
| 2008/0040264 A1 | 2/2008 | Allin et al. |
| 2008/0046363 A1 | 2/2008 | Ali et al. |
| 2008/0114670 A1 | 5/2008 | Friesen |
| 2008/0123932 A1 | 5/2008 | Jones et al. |
| 2008/0162311 A1 | 7/2008 | Hendrix et al. |
| 2008/0168068 A1 | 7/2008 | Hutheesing |
| 2008/0208727 A1 | 8/2008 | McLaughlin et al. |
| 2008/0229218 A1 | 9/2008 | Maeng |
| 2008/0249902 A1 | 10/2008 | Lehman et al. |
| 2008/0249936 A1 | 10/2008 | Miller et al. |
| 2008/0249951 A1 | 10/2008 | Gilder et al. |
| 2008/0281702 A1 | 11/2008 | Kirkwood |
| 2008/0288413 A1 | 11/2008 | Weber |
| 2008/0319882 A1 | 12/2008 | Wyle |
| 2009/0060314 A1 | 3/2009 | Price et al. |
| 2009/0063206 A1 | 3/2009 | Payne et al. |
| 2009/0106152 A1 | 4/2009 | Dill et al. |
| 2009/0132286 A1 | 5/2009 | Blaquier |
| 2009/0132414 A1 | 5/2009 | Philliou et al. |
| 2009/0164325 A1 | 6/2009 | Bishop et al. |
| 2009/0182605 A1 | 7/2009 | Lappas et al. |
| 2009/0204519 A1 | 8/2009 | Randell et al. |
| 2009/0204522 A1 | 8/2009 | Meyer et al. |
| 2009/0244600 A1 | 10/2009 | Haycock |
| 2009/0292619 A1 | 11/2009 | Kagan et al. |
| 2009/0328158 A1 | 12/2009 | Ollila et al. |
| 2010/0070397 A1 | 3/2010 | Hahn-Carlson et al. |
| 2010/0114766 A1 | 5/2010 | Gustin et al. |
| 2010/0128324 A1 | 5/2010 | Price et al. |
| 2010/0145839 A1 | 6/2010 | Lam et al. |
| 2010/0161466 A1 | 6/2010 | Gilder |
| 2010/0306103 A1 | 12/2010 | Hankins et al. |
| 2011/0184843 A1 | 7/2011 | Orttung et al. |
| 2011/0184868 A1 | 7/2011 | Lacerte et al. |
| 2011/0196771 A1 | 8/2011 | Lacerte et al. |
| 2011/0196786 A1 | 8/2011 | Lacerte et al. |
| 2011/0270749 A1 | 11/2011 | Bennett et al. |
| 2012/0023016 A1 | 1/2012 | Babu |
| 2012/0036065 A1 | 2/2012 | Orttung et al. |
| 2012/0041879 A1 | 2/2012 | Kim et al. |
| 2013/0204756 A1 | 8/2013 | Orttung et al. |
| 2013/0226798 A1 | 8/2013 | Orttung et al. |

OTHER PUBLICATIONS

Avery, S., "Computers, Business Systems and Office Products," Purchasing, Boston, Jul. 11, 1996, pp. 125-135, vol. 120, Issue 11.

Office Action for U.S. Appl. No. 12/483,731, Jul. 20, 2010, 43 pages.

Bers, J.S., "Image-Based Bill Payment Profits Bank of Montreal," Bank Systems and Technology, New York, Oct. 1999, p. 33, vol. 33, Issue 10.

Dent, A.L., "Managing Your Agency Office," Canadian Insurance, Toronto, Sep. 1980, p. 22, vol. 85, Issue 10.

Tulenko, P., "Keeping Honest Workers Honest," Cincinnati Post, Cincinnati, Ohio, Mar. 20, 2006, p. c.8.0.

Quickbooks course, Sun Journal, Sep. 24, 2007:B3.

* cited by examiner

202 — From:
Acme Corp
Every Lane
Toontown, CA

203 — To:
Wyle Coyote
Any Hole
NoWhere, CA

| | |
|---|---|
| Giant rubber band | $100.00 |
| Gain slingshot frame | 550.00 |
| Rocks, dozen | 20.00 |
| Helmet | 70.00 |
| Head bandage | 10.00 |
| Total | $750.00 |

204, 205

200B

Customer:
Wyle Coyote
Any Hole
NoWhere, CA — 203

Pay To: — 202
Acme Corp
Every Lane
Toontown, CA

| | |
|---|---|
| Giant rubber band | $100.00 |
| Gain slingshot frame | 550.00 |
| Rocks, dozen | 20.00 |
| Helmet | 70.00 |
| Head bandage | 10.00 |
| Total | $750.00 |

204, 205

201 — A

```
                                                    ┌─ 1000
                                                    ▼

┌1007
     From:    Acme Corp
     Acme Corp     Attn: Payment Processing
1001─Every Lane    PO Box 12345
     Toontown, CA  Toontown, CA  12345-6789

To:                     ┌1003    ┌1004
1002─Wyle Coyote   Account No.: 12345
     Any Hole
     NoWhere, CA  Invoice No.: 98765

Giant rubber band   $100.00  ┐
     Gain slingshot frame  550.00  │─1005a-n
     Rocks, dozen           20.00  │
     Helmet                 70.00  │
     Head bandage           10.00  ┘

Total              $750.00 ──1006
```

Fig. 10

- ☐ Check to receive future payments electronically (free).
- 2005 — ABA#: _____
- 2006 — A/C#: _____
- 2007 — E-Mail: _____
- 2008 — For Additional information. Visit WWW.****.COM/TC

METHOD AND SYSTEM FOR USING SOCIAL NETWORKS TO VERIFY ENTITY AFFILIATIONS AND IDENTITIES

CROSS-REFERENCE TO RELATED APPLICATION

This application claims priority under 35 U.S.C. §119(e) to U.S. Provisional Patent Application Ser. No. 61/608,068, filed on Mar. 7, 2012.

The present application relates to U.S. patent application Ser. No. 12/363,647, filed on Jan. 30, 2009, which claims priority under 35 U.S.C. §119(e) to U.S. Provisional Patent Application Ser. No. 61/025,255, filed Jan. 31, 2008; U.S. Provisional Patent Application Ser. No. 61/059,624, filed Jun. 6, 2008; U.S. Provisional Patent Application Ser. No. 61/088,984, filed Aug. 14, 2008; U.S. Provisional Patent Application Ser. No. 61/140,752, filed Dec. 24, 2008; and U.S. Provisional Patent Application Ser. No. 61/141,819, filed Dec. 31, 2008. The present application also relates to U.S. patent application Ser. No. 13/087,215 and U.S. patent application Ser. No. 13/087,219, both filed on Apr. 14, 2011, and U.S. patent application Ser. No. 13/045,948 and U.S. patent application Ser. No. 13/046,335, both filed on Mar. 11, 2011, which applications claim priority under 35 U.S.C. §119(e) to U.S. Provisional Patent Application Ser. No. 61/313,075, filed on Mar. 11, 2010, and U.S. Provisional Patent Application Ser. No. 61/356,477, filed on Jun. 18, 2010. The subject matter of all of the foregoing is incorporated herein by reference in their entirety.

BACKGROUND OF THE DISCLOSURE

1. Field

This present disclosure relates generally to automated computer processing of invoices, payments, and money transfers.

2. Description of the Related Art

For years companies have been trying to move transactions into an electronic system. Large businesses have the resources and scale to justify the installation of new electronic systems. However, for a large segment of small and medium size enterprises (SMEs), such attempts have not fared well. This is because it is not cost effective for SMEs to install a dedicated system and there is no standardized transaction system to allow the sharing of costs among many different businesses.

In addition, traditional payment methods typically require related parties to know each other's bank accounts. For example, in order for a payor to electronically transfer a payment into a vendor's bank account, the payor must know the vendor's bank account number and ABA routing number. When the vendor receives the payment, it can also find out the payor's bank account number. Thus, entities cannot hide their bank account information when making/receiving payments using the traditional payment methods.

BRIEF DESCRIPTION OF THE DRAWINGS

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

FIG. 2 are diagrams of two exemplary invoices according to one embodiment of the present disclosure.

FIG. 10 is a diagram of an exemplary invoice according to one embodiment of the present disclosure.

DETAILED DESCRIPTION

Reference in this specification to "one embodiment" or "an embodiment" means that a particular feature, structure, or characteristic described in connection with the embodiment is included in at least one embodiment of the present disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Automated Invoice Capture

Figure 1:
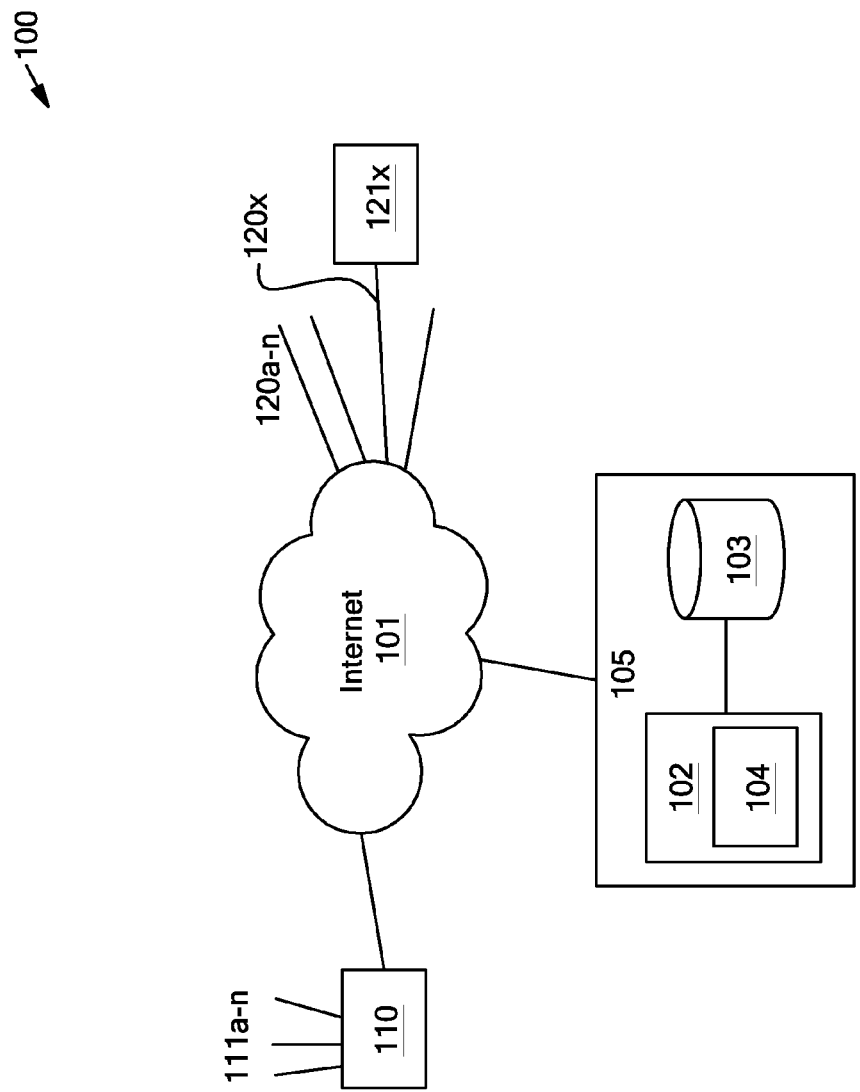
FIG. 1 is a block diagram of an exemplary system according to one embodiment of the present disclosure.

FIG. 1 shows an overview of an exemplary system 100 according to one embodiment of the present disclosure. An electronic service provider 110, such as eFax Services, is connected to the Internet 101. Other intranet or networks could be used instead of the Internet. Also connected to electronic service provider 110 are multiple fax lines (or fax numbers) 111a-n for receiving faxed invoices. Customer sites 121a-n (of which, for clarity and simplicity, only 121x is shown) connect to the Internet 101 via connections 120a-n. Corporate site 105 of an operator of this exemplary system 100 is represented here by a server 102, a storage system 103, and software 104 installed on the server 102. The actual architecture of such a system may, and in most cases probably will, comprise many servers, multiple storage systems and/or hard drives, and multiple instances of software. All these possible components are represented here by the single instances of the components of site 105.

FIG. 2 shows typical invoices as received, represented here as exemplary invoices 200A and 200B, according to one embodiment of the present disclosure. These invoices are issued by one party (the issuer) to another party (the recipient). Invoices 200A and 200B contain the following data, although with a slightly different layout: issuer logo 201, issuer name and address 202, recipient address 203, line items 204 and total amount due 205. Other additional data such as terms, due date, etc., are not shown in FIG. 2, but such data are customarily included on typical invoices.

One aspect of the present disclosure includes approaches for recognizing an invoice, for example identifying the issuer of the invoice and/or recognizing the layout of the invoice.

Invoices can be recognized by comparing them to a database of distinguishing features. For example, invoices might be recognized based on the logo of the issuer, name and/or address of the issuer, or other data or signature features that are unique to an issuer. Once an invoice is recognized, a corresponding template can be applied to extract the relevant data from the recognized invoice.

There are various modes by which an invoice may be entered into the system and various media on which the invoice may be received. For example, the recipient of a paper invoice could fax it to a dedicated fax number for that recipient's account, such as, for example, any of fax numbers 111a-n shown in FIG. 1. Alternately, the recipient of the invoice could instruct the issuer to fax the invoice directly to said account's dedicated fax number. In yet another case, an invoice recipient may have a customized email address residing on or connected to server 102, to which invoices may be emailed with attached files of any of various popular word processing or accounting or image capture programs, such as, for example, MS Word or Adobe Acrobat. In any case such a file may be converted into an image file showing the image of the invoice. In the case of a Word file, depending on the complexity of the format, direct parsing may be applied. Alternately, the file may be printed to an Adobe Acrobat portable document file (.PDF) file and then processed as an image.

Once received, invoices can be recognized using many different types of distinguishing features beside those discussed above. Additional examples include but are not limited to black/white histograms, color histograms, sectional signatures and sectional histograms. OCR (Optical Character Recognition) can also be used as a part of the recognition process. It can be applied to just the header, to the entire invoice or to any part of the invoice. The result of the OCR can be used as the basis for recognizing an invoice. Alternately, OCR can be applied after an invoice has been recognized, in order to extract data from the invoice. Other examples of distinguishing features include metadata (e.g., fax number, issuer e-mail address, subject line, pdf- or Word-metadata, keywords, barcode), number of pages, OFX (Open Financial Exchange) download, and XML (eXtensible Markup Language) fields or tags. Other suitable structured files with a certificate may be used in other cases.

Figure 3:
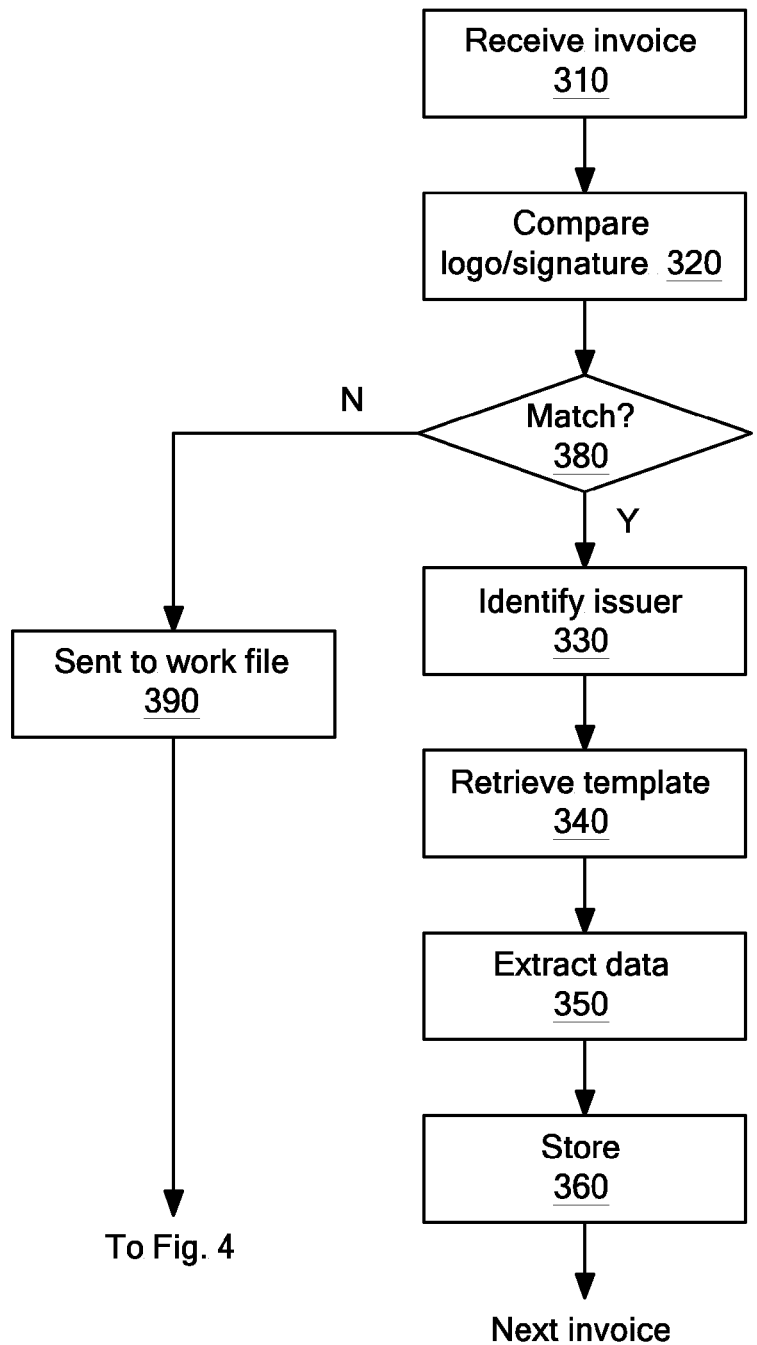
FIG. 3 is a flow diagram of an exemplary method for processing invoices according to one embodiment of the present disclosure.

FIG. 3 shows an exemplary process 300 for processing a typical invoice, such as invoice 200A or invoice 200B, according to one embodiment of the present disclosure. The process 300 may be implemented by an electronic payment system such as the one shown in FIG. 1. The invoice image is received 310, for example by one of the ways described above. It may be emailed or uploaded or transferred by any of several electronic means from the site of service provider 110 to the site of system operator 105. The system 105 compares 320 the invoice to a database in storage system 103 that contains distinguishing features for known invoices. For example, the system 105 may search for a matching logo in a library of known issuer logos or search for a matching signature (or seal) in a library of known issuer signatures. In some cases, other distinguishing features (e.g., the originating fax number, the originating email address) may be used in addition to or in place of the logo pattern and signature to recognize the invoice.

At step 380, the process branches. If no match is found (no branch), the invoice is sent 390 to a work file, in which unprocessed documents are stored. Treatment of the documents in this work file is explained below, in the description of FIG. 4. If a match is found for the logo pattern or signature (yes branch), the system 105 identifies 330 the issuer. A corresponding template for the recognized invoice is also retrieved 340 from storage system 103. The template includes instructions for extracting data from the invoice, for example it may define fields identifying where and/or in what format on the invoice certain data is expected to be located. In some cases, an issuer may have more than one template. For example, the issuer may have different templates for personal users and for business customers. As another example, the issuer may have different templates for single-page and multi-page invoices, or may simply change the format of its invoice over time or by geographic region. Accordingly, the system 105 may use more refined decision-making processes to select the correct template for a particular invoice.

Data is extracted 350 from the invoice based on the selected template, using OCR and/or other suitable means. In some cases the image may be processed using OCR before it is received 310, for example, by using OCR functions provided by Adobe and other tools by other companies. The information extracted in step 350 is preferably stored 360 in a database that also resides in storage system 103.

In one approach, once a template is identified for an invoice, data may be automatically extracted from the invoice (e.g., as identified by fields in the template). In another approach, invoices may be grouped together based on their similarity. Data extracted from certain locations in one invoice may be extracted from similar locations in other invoices in the group. Previously discovered data patterns may be reused on similar invoices. Data can also be manually extracted. Different pattern recognition engines, expert systems, rule-based engines and other approaches may also be used to extract data from invoices.

Processed invoices can also be used to check or refine the templates for an issuer. Differences between invoices for the same issuer or deviations from past norms can also be used to flag potential problems, as well as to request human review.

Figure 4:
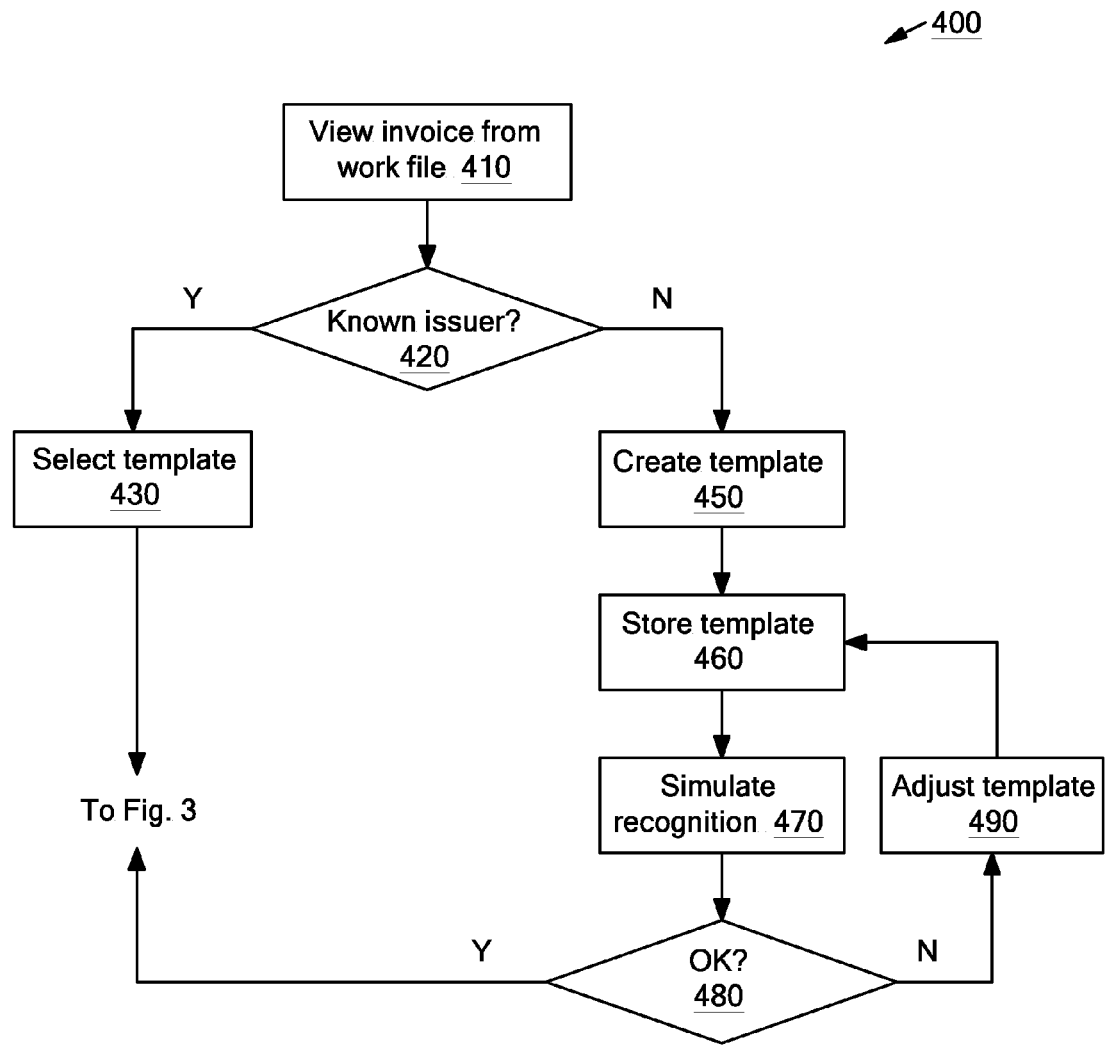
FIG. 4 is a flow diagram of an exemplary method for processing unrecognized invoices according to one embodiment of the present disclosure.

FIG. 4 shows an exemplary process 400 for processing unrecognized invoices that were previously stored in a work file in step 390 of FIG. 3, according to one embodiment of the present disclosure. An invoice is retrieved 410 from the work file, which resides in storage system 103. The invoice is presented for manual viewing 410 by a human operator. In step 420, the process branches. If the operator determines that the invoice is a document from a known issuer with known logo pattern/signature (yes branch) but, for whatever reason, the logo pattern/signature recognition has not worked (for example, a coffee stain on the logo may have made the logo unreadable to the automated recognition system), the process moves to step 430. The operator selects 430 a matching template and sends 440 the invoice back to the recognition process 300 (e.g., to data extraction step 350).

If, however, in step 420, the operator determines that the invoice cannot be matched with a known template (no branch), the operator creates 450 a new template. This new template may be created completely new or it may be created by modifying a suitable existing template. The new template, along with its issuer information and the invoice, is stored 460 in storage system 103. In step 470, a recognition simulation is performed to verify that the new template works correctly, namely that (1) the automated recognition system can properly identify the new template for the invoice and (2) data can be accurately extracted from the invoice based on the template. If, in step 480, the template simulation works correctly (yes branch), the invoice is sent 440 to the recognition process 300 as described above (e.g., to data extraction step 350). If, however, the simulation does not work correctly (no branch), the template may be manually adjusted 490. The template editor may highlight the section that created problems. For example, a field for OCR may be too narrow or too wide. If the field is too wide, for example, the system may attempt to interpret a part of the logo as a part of the address. In the case of a field that is too narrow, some characters may be cut off. The operator can adjust 490 the template accordingly to solve such problems.

Another aspect of the present disclosure is cross-organizational learning. For example, if an invoice addressed to Customer A is identified as being from Vendor 1, and the system can then identify other signature items (image, "from" address, etc.) in the invoice. Thereafter the system may be able to use those other signature items to select the correct template for the invoice, and use that template to find the correct data in certain sections of the invoice. Additionally, if a same format invoice from this same Vendor 1 is sent to a second Customer B, then the system can recognize from the signature information that the invoice is from Vendor 1 and apply the template to the invoice to extract the correct data.

One advantage of the approach described above is that the capture of invoices can be made economical for SMEs. The number of invoices processed can be aggregated over a large number of SMEs, thus achieving economies of scale that can be shared by the businesses. In addition, although any one SME may only receive a few invoices from any particular issuer, the community of SMEs in the aggregate may receive a large number of invoices from that issuer. This then makes it cost efficient to develop templates or other processes to handle those invoices, whereas it would not be cost efficient for each SME to do so individually. The system of FIG. 1 can be implemented without significant additional investment by either the issuers or the recipients. The cost of system 105 is shared by all users and not borne entirely by one user. The recipients can send invoices to the system 105 using conventional means, such as fax and email. The invoices between issuers and recipients can be settled using conventional means such as checks, EFT, and ACH, or using advanced means such as the enhanced private interbank clearing system described in more detail below with respect to FIGS. 16A-B and 17. In addition, as described above with the example using Customers A and B, and Vendor 1, information learned from processing one recipient's invoices can be used to improve the overall process for all recipients.

In one approach, the community of recipients can themselves improve the process. For example, the system 100 can enable the community to provide input about distinguishing features of the invoices. Various recipients and/or issuers may suggest different features for recognizing invoices. There may even be a community process for determining preferred features for distinguishing invoices. A similar process can be used to determine templates, including determining fields in templates.

Another aspect of community is that different recipients can exchange their experiences of dealing with issuers. Many recipients may be in a similar situation with respect to issuers. Another beneficial aspect of the community is that SMEs are likely to deal with "small" issuers. There will be a very large number of small issuers (approximately 25 million in the U.S.), but each one issues invoices to only a small number of customers (typically, 20-30). While it is not economical for a centralized identification process to be applied to this set of issuers, it is economical to let the recipients/issuers themselves help identify the issuers and, in the aggregate, create a comprehensive catalog of the issuers.

Therefore, the described systems and processes allow the integration of paper and/or electronic document invoices into an automated system to reduce the need of manual labor (such as manual input of invoices) in processing the transactions. In addition, the systems can be fully automated and process these transactions without human intervention.

Enhanced Invoice Payment Document Generation

Figure 5:
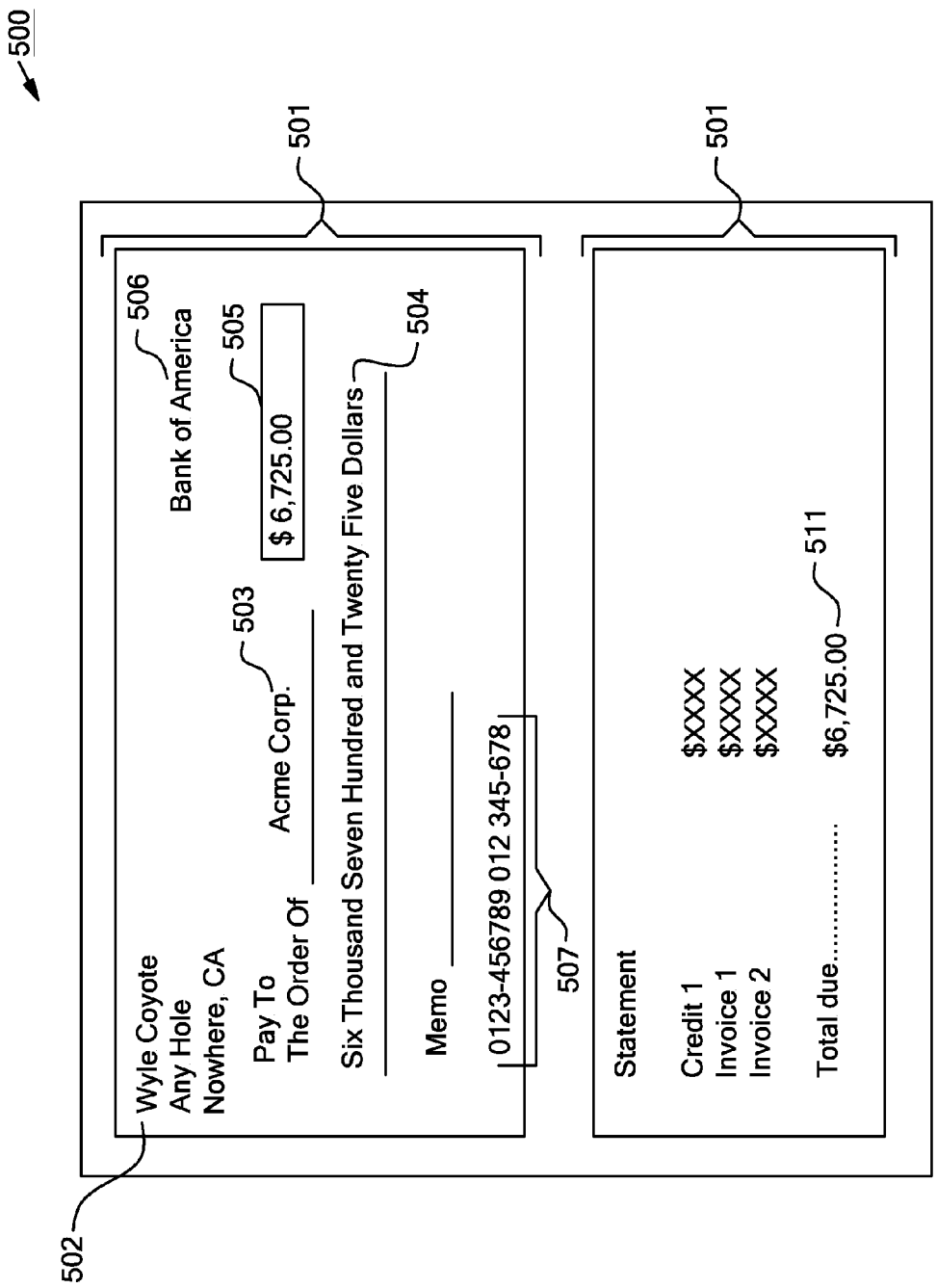
FIG. 5 is a diagram of a typical payment document according to one embodiment of the present disclosure.

FIG. 5 shows an overview of a typical payment document 500 with a check section 501 and a statement section 510, according to one embodiment of the present disclosure. The payment document 500 is often printed on a letter- or A4-sized bifold with three sections with the check section 501 on top and the statement section 510 occupying the lower two-thirds. The check section 501 contains information about a payor 502, a payee 503, an amount in words 504, an amount in numbers 505, additional banking information 506, and information such as the ABA routing number and check number 507. The statement section 510 shows credits and invoices and also shows a total due 511 that typically reflects the amount shown in payment amounts 504 and 505. In some cases, total 511 may differ from payment amounts 504 and 505, because the total due 511 may take into account other credits or debits.

Figure 6:
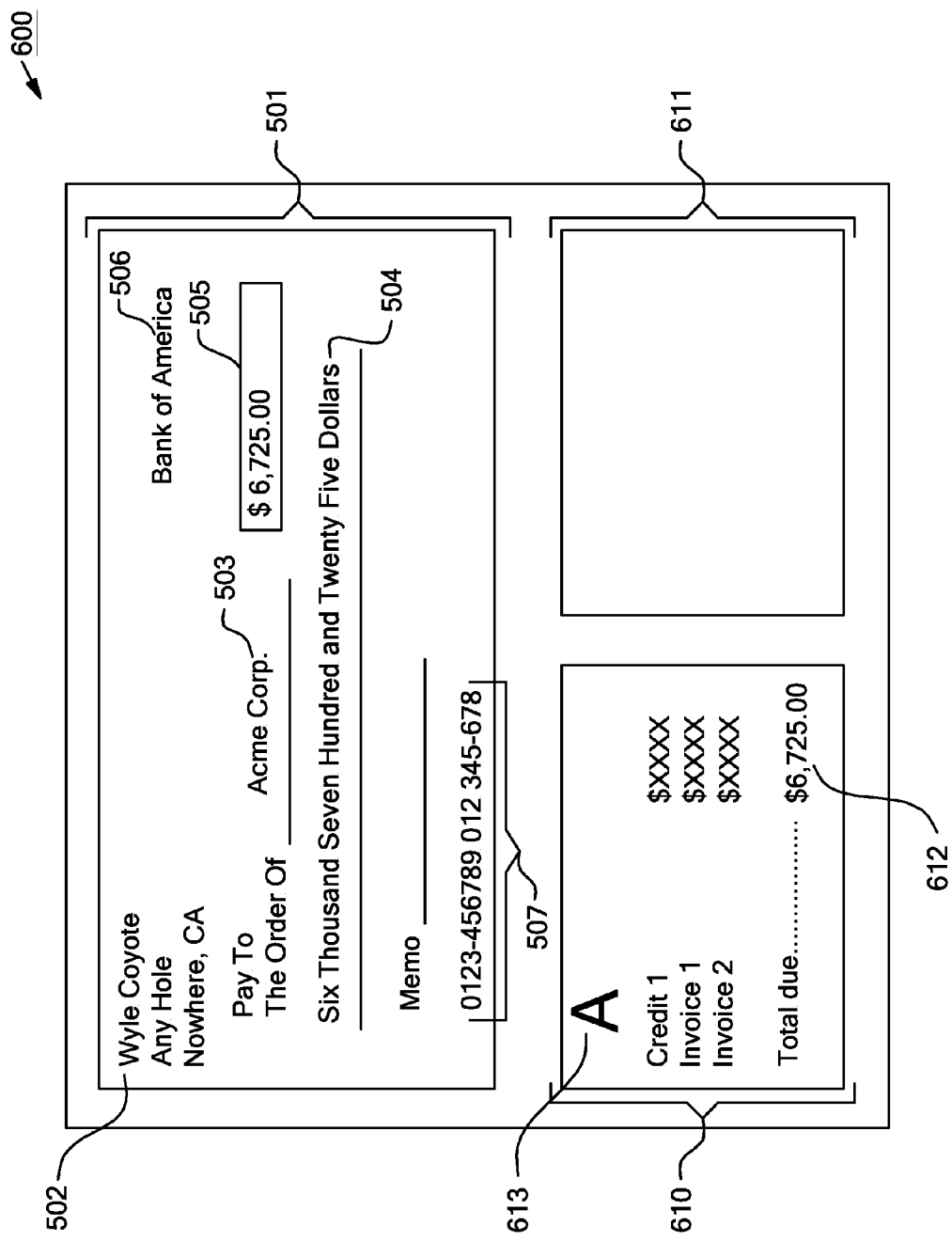
FIG. 6 is a diagram of an enhanced payment document according to one embodiment of the present disclosure.

FIG. 6 shows an enhanced payment document (also referred to as an enhanced invoice payment document) 600, according to one embodiment of the present disclosure. As shown, the enhanced payment document 600 contains a check section 501, a communication section 610, and a payor supplemental section 611. Elements of the check section 501 are described above in FIG. 5. The lower two-thirds of the payment document 600 includes the communication section 610, which in this example is an actual copy or image of the invoice being paid by this check, and the payor supplemental section 611. The invoice image or copy in this example contains the logo 613 of the billing party, the items billed and the billing total 612, which in this example agrees with the payment amounts 504 and 505. Payor supplemental section 611 is available for optional additional payor information, such as notes about this transaction, a mini-statement, and/or an advertisement.

Figure 7:
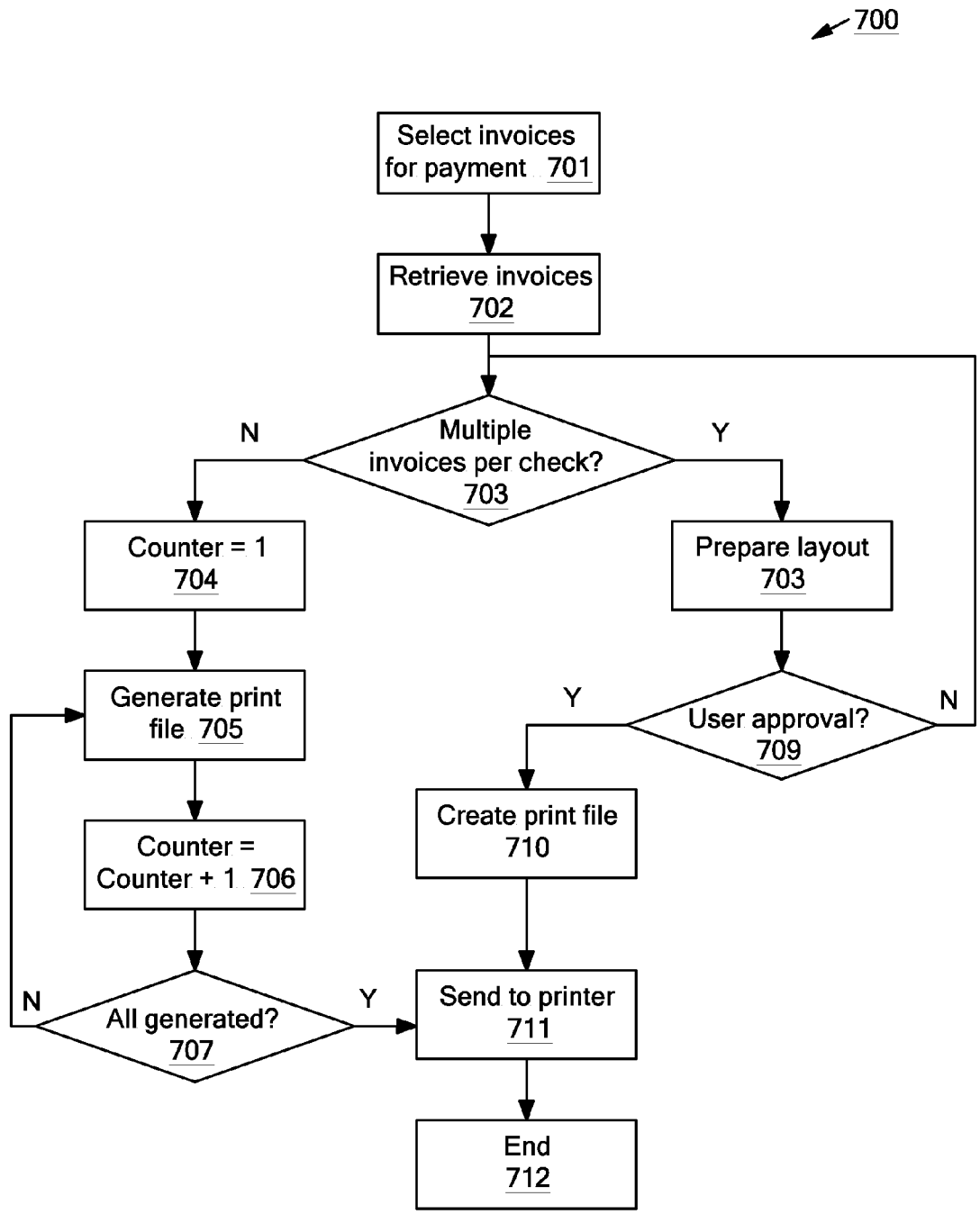
FIG. 7 is a flow diagram of an exemplary process for generating enhanced payment documents according to one embodiment of the present disclosure.

FIG. 7 shows an exemplary process 700 for generating the enhanced payment document 600 according to one embodiment of the present disclosure. The process 700 may be implemented by an electronic payment system (EPS) such as the one shown in FIG. 1. Initially, a user selects 701 invoices for payment and enters that information into the system. The system retrieves 702 the selected invoices from data repository 103.

At step 703, the system asks the user if the user wants to write one check for multiple invoices and the process branches based on the user's answer. This option may be presented to the user each time process 700 is implemented, or the user could configure the system to always select or never select this option. If a check is generated for only one invoice (no branch), the system sets 704 a counter to 1 and generates 705 a payment document print file for a first invoice. As described above for the payment document 600, the payment document contains an image of the first invoice. In step 706 the counter is advanced one increment. In step 707 the process branches, depending on whether payment documents have been generated for all the pending invoices. If all have been generated (yes branch), the process advances to step 711, where the payment document print files are printed and the payment documents are stored in data repository 103 for recording, and the process terminates at step 712. The print files may be printed locally or remotely (e.g., through the data repository 103). If payment documents have not been generated for all invoices (no branch), the process loops back from step 707 to step 705, and another payment document is generated for the next invoice, and repeats until all pending invoices are paid.

Alternatively, if, in step 703, the user elects, or the system is configured to pay multiple invoices with one check (yes branch), the system prepares 708 a layout of the payment document. The payment document may optionally be presented to the user for approval 709. If the user does not accept the layout (no branch), the process goes back to step 703, where the user may elect to print a payment document for each invoice separately. If, in step 709, the user accepts the proposed layout (yes branch), the system generates 710 a payment document print file containing multiple invoice images and whose check payment amount equals the total of all the included invoices. The invoice images may be smaller than they would be in a payment document containing only one invoice image, depending on the number of invoices being paid and the layout of the payment document. In step 711, the payment document is sent to a printer (local or remote) and data repository 103 (from which the remote printing may occur), and the process terminates at step 712.

In some cases, an image of the invoice may be printed on the same page as the check; while in other cases, multiple images may be printed. In yet other cases, one or more images may be printed on the back of the page, opening the front for classic statements or other uses, including but not limited to advertisements, promotions or campaigns.

In some cases, instead of or in addition to printing an image of the invoice on the payment document, an identifier of the invoice image may be printed on the check section of the payment document. For example, a URL (Uniform Resource Locator) of an invoice image may be printed on the face (or the back) of the check. As a result, one can correctly and easily identify the corresponding invoice for a check payment by visiting the printed URL. The identifier can also be incorporated into the payment transaction in other manners based on the nature of the payment. For example, if the payment is made through an ACH transaction, a URL of the invoice may be included in the ACH addenda field. As a result, the URL will subsequently show up on the payor and/or payee's bank's web summary and bank statement.

Therefore, the described systems and processes provide a simple, easy-to-use approach to generate enhanced invoice payment documents with features that ensure that the credits of the underlying payments are applied to the correct invoices.

Enabling Correct Check and Electronic Payment Deposit

Figure 8:
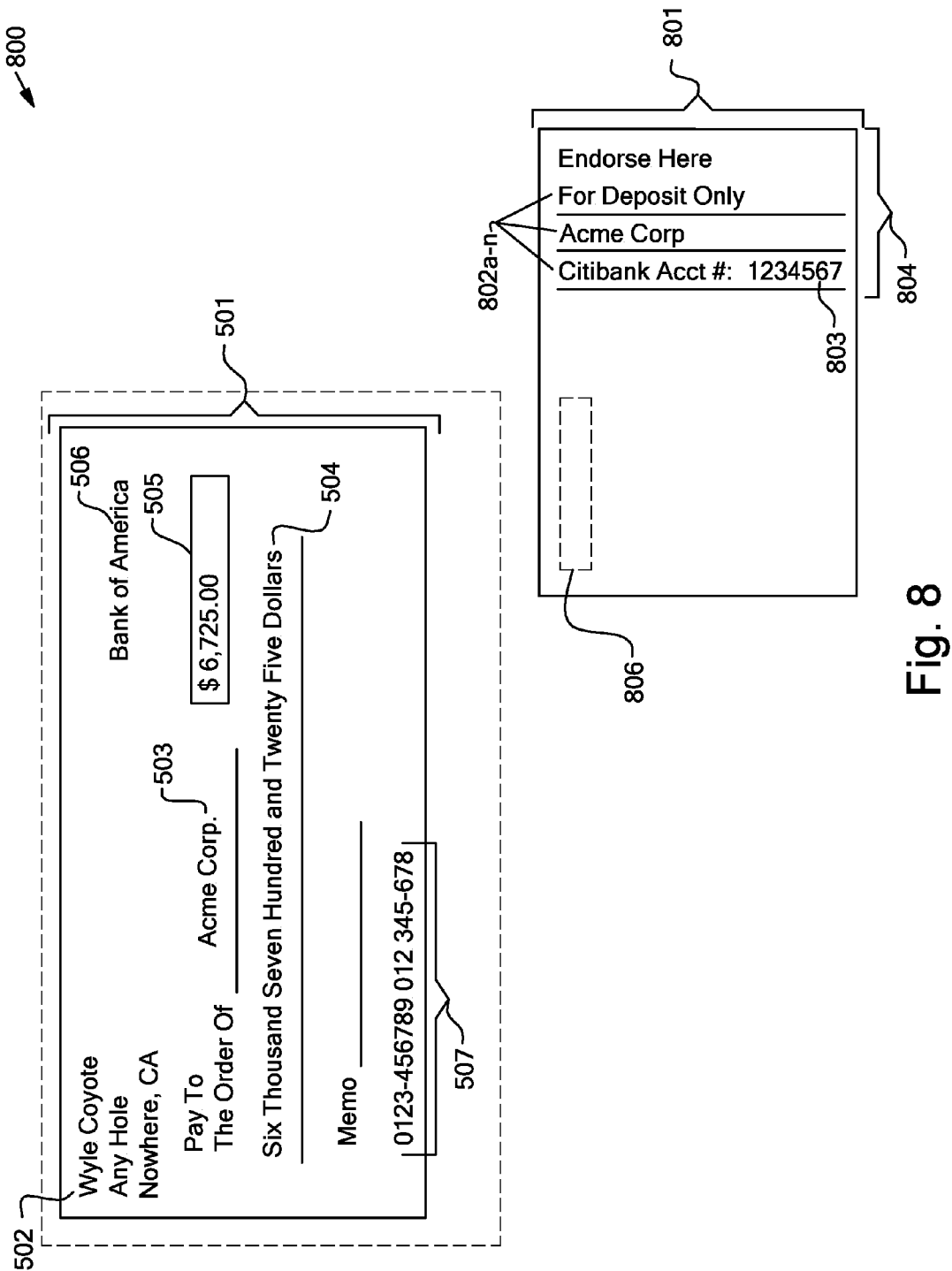
FIG. 8 shows the top part of a payment document shown in FIG. 6 according to one embodiment of the present disclosure.

FIG. 8 shows the top part (check section 501) of the payment document 600 shown in FIG. 6. Section 801 shows the back side of the check section 501 according to one embodiment of the present disclosure. Banking information 506 on the front side is shown on the back side as a dotted box 806. Also shown is the dotted line 803 that separates the endorsement section 804 from the rest of check back side 801. Also shown is a section 802a-n where endorsement information is preprinted on the back of the check in high-quality black ink. This endorsement information is solicited from the payee of the check before the payor mails out the check.

Having the endorsement information thus clearly printed is advantageous compared to using a standard institution endorsement stamp, because the latter can be smudged, faint, or otherwise difficult to read. Having the endorsement information clearly printed also reduces the risk of the check being erroneously or fraudulently deposited in a wrong account.

Also, since the check is eventually cleared by a depositing bank, it is reasonable that the depositing bank verified the endorsement information. In addition, the deposit information may be captured from the depositing bank and transferred to the drafting bank or an electronic payment system (EPS) such as the one shown in FIG. 1 to verify payee information. As the real time processing of checks is done, all the payee information and deposit information is available to the involved banks. The payor of the check and EPS may obtain such information from the banks. In addition, as described in further detail below, the deposit information can also be used to ensure correct deposit of electronic payments.

Figure 9:
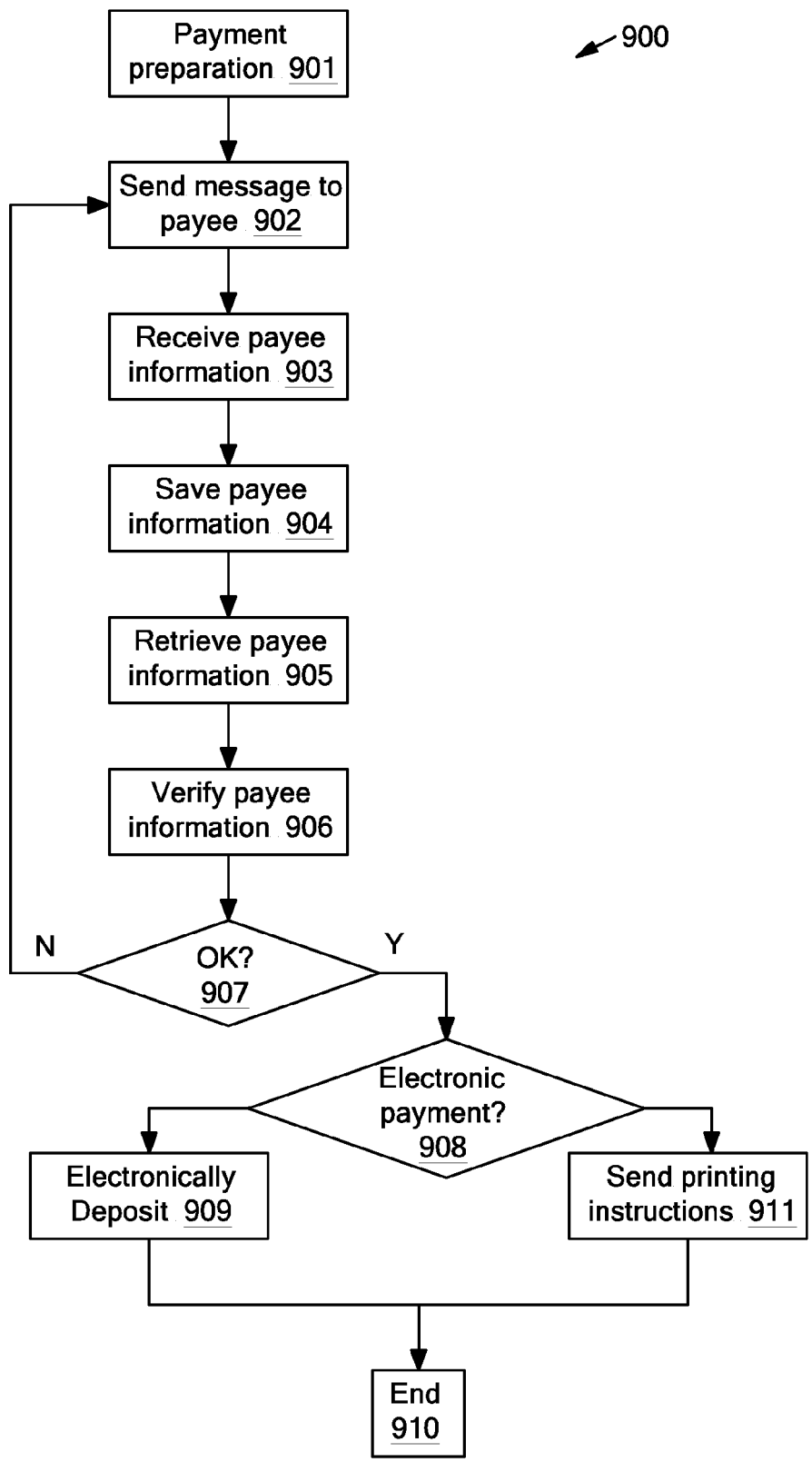
FIG. 9 is a flow diagram of an exemplary process for verifying that checks are correctly deposited according to one embodiment of the present disclosure.

FIG. 9 shows an exemplary process 900 for ensuring correct payment deposit according to one embodiment of the present disclosure. The process 900 may be implemented by an electronic payment system (EPS) such as the one shown in FIG. 1. In step 901 the system pulls payee data (e.g., payee identity, payment amount) from data repository 103 for payment preparation. In step 902 the system sends a message to a payee who has not previously participated in the service provided by the system. These messages may be sent by email, SMS (Short Message Service), facsimile, or other similar messaging systems. Such a message may, for example, contain a URL (Uniform Resource Locator) that opens a web user interface upon user selection. A user can confirm the user's payee identity and enter data such as, for example, banking information in the web user interface. In other cases, instead of a URL, a callback number may be offered, where a caller can leave payee information with a call center agent or IVR (Interactive Voice Response). In yet other cases, an email or SMS address may be included in the message, for the user to respond and provide payee information. Additional information may be provided to the payee (e.g., in the message or the web user interface) to assure the payee that, for example, the provided user information will not be passed on to the payor, or to show legitimacy of the user data solicitation (e.g., showing billing information).

The system receives 903 the solicited payee information (e.g., deposit information) from the payees and stores 904 the payee information in data repository 103. The payee may respond to the soliciting message and sets up a payee account with all the required deposit information, thus helping the system to obtain new customers. In step 905 the system retrieves payee information from data repository 103. In step 906 the system may additionally verify the received payee information by executing a mock transaction. As described in detail below, the mock transaction verifies payee information through approaches such as the random deposit approach.

In step 907, the process branches. If the data is not satisfactorily verified (no branch), the process returns to step 902 and the system sends a new message to the payee soliciting information. If the data is satisfactorily verified (yes branch), the process branches again in step 908 based on whether the payment is an electronic payment. If the payment is an electronic payment (yes branch), in step 909 the system deposits the electronic payment to an account (e.g., through an ACH transaction, an EFT payment, or a wire transfer) specified by the verified payee information (e.g., account name, routing number, account number). The process ends in step 910. If the payment is a paper check payment (no branch), in step 911 the system sends print instructions to a check printer, including instructions for printing information such as the payee name, account number, ABA (American Bankers Association) number, and other similar information on the endorsement section of the check. The process ends in step 910.

If the system receives no response to its message from the payee through the web interface within an allotted time period, such as, for example, two business days, the system sends out a check to the payee without printing information on the endorsement section.

The mock transaction utilized by the system to verify 906 payee information may involve one or more transactions designated to verify various aspects of the payee information. For example, the system may create a check used to verify the deposit information provided by the payee and send the check to the payee. The check may include a partial payment of an outstanding invoice. If the check is subsequently successfully deposited, the system can assume that the depositing bank has verified the deposit information, consider such information verified, and make payment for the remaining portion of the invoice. Thus, the process allows such verification before starting electronic transfers at all, thus helping to add a layer of security to avoid payments from being misrouted.

As another example, a partial payment of an outstanding invoice may be made via electronic payment (e.g., ACH) according to the deposit information provided by the payee, and the remaining balance of the invoice may be paid via a check. Once the customer has confirmed that the electronic payment was successfully posted, the system considers the provided deposit information successfully verified and makes subsequent payments electronically according to the verified deposit information. The payee may specify a preference of electronic payment, check payment, or a combination of both. The system can make the payments according to the user preference.

As a third example, the mock transaction may conduct a random deposit that involves crediting or debiting a random small amount (typically two small transactions) and then request the payee to verify either the transaction ID or the cent amounts. The random deposit approach helps to identify inaccurate account numbers (e.g., typos) and verify that the person providing the information has legal access to the account being set up.

In another aspect, the system reconciles the payee information with additional data in addition to or instead of the random deposit approach to prevent check fraud (e.g., illegitimate account). For example, the system may populate the bank information of the payees from the endorsement from the primary bank shown on previously cleared checks, and use such information to verify against the provided payee information. If the information matches, the payee information is deemed to be verified. If there is a partial match, a judgment call is made by a risk underwriter. If there is no match, the payee fails the verification 906. Such bank information may be solicited from the depositing bank by separate transmission or from other service providers such as SAFECHECKS (see http://www.positivepay.net/). The information retrieved from previously cleared checks can also be used to reconcile payee identity (e.g., name) on the record to detect fraud.

In yet another aspect, the system considers certain users (e.g., administrators of working accounts) trustworthy, and either does not verify 906 or verifies 906 their payee information with less scrutiny. In addition, trusted administrators of working accounts can extend their trust or infer trust onto others by being involved with setting up accounts, for example, of key vendors or clients, thus implicitly extending their trust. A composite trust rating considers items such as how often, how much, for how long and how recently successful transactions have been completed in conjunction with a particular administrator. In some cases, a single composite score includes weighted aspects. In other cases, two or more scores may be used to represent different aspects, individually or in combination.

A trusted administrator can confer some of his or her composite trust rating by inviting and confirming new applicants. Typically, only a certain percentage of influence by the trusted administrators will be allowed to be inferred. The rest can be earned, or determined by providing multiple references. Certain events as well as non-events may reduce the trust of an administrator. Others may increase it. Typically, a separate, but related value may be used for the company of the trusted administrator, creating a network of trust relationships. This can also be used to help other things, such as the company's credit worthiness.

Therefore, the described systems and processes generate enhanced payment documents with features that ensure that the payment will be deposited in the correct account, and thus prevents mistakes and frauds. The described systems and processes also reconcile cleared checks with records and name identification data.

Correct Invoice Payment Deposit

FIG. 10 shows an invoice 1000 according to one embodiment of the present disclosure. It has, for example, the address 1001 of the issuer or sender, recipient's address 1002, items billed 1005a-n, payor account number 1003, invoice number 1004, bill total 1006, and an address 1007 to which to send payment. Address 1007 may contain postal address and/or electronic payment address information.

Figure 11:
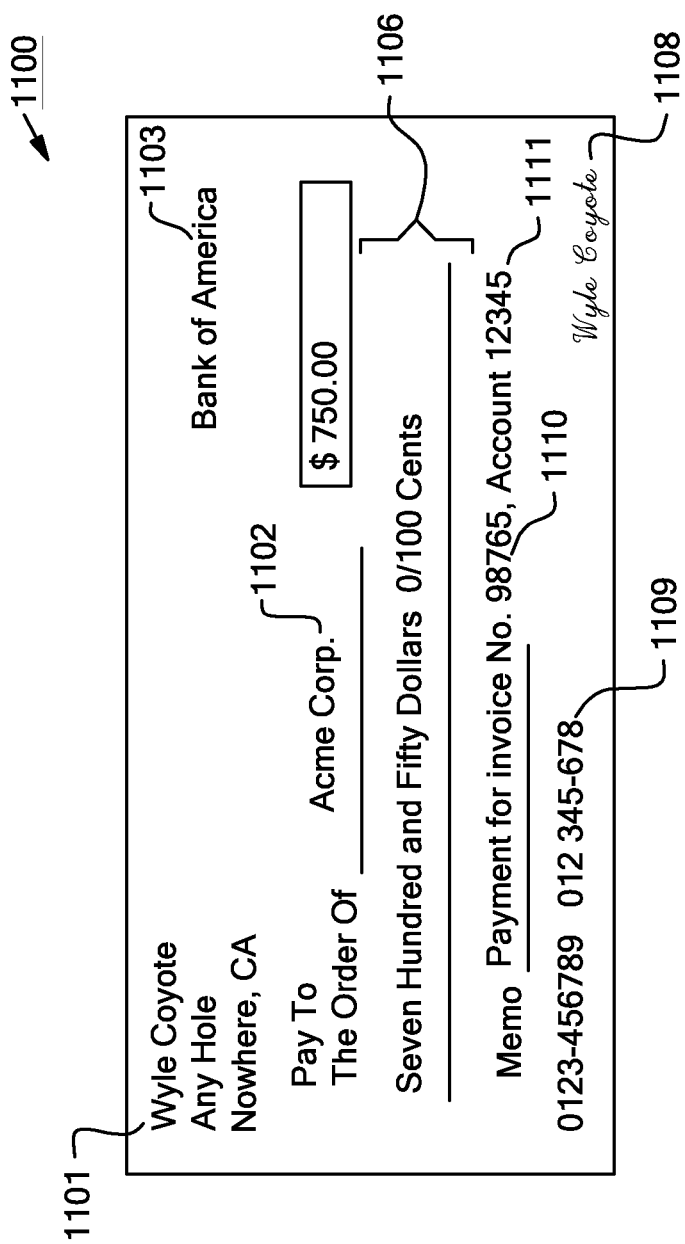
FIG. 11 is a diagram of an exemplary check according to one embodiment of the present disclosure.

FIG. 11 shows a typical check 1100, such as a payor might return in response to invoice 1000, according to one embodiment of the present disclosure. Check 1100 has, for example, a payor address 1101, a payee identity 1102, an amount field 1106 stating the check amount in both words and number, some bank information 1103, an invoice number 1110, an account number 1111, signature confirmation or other accreditation information 1108, and bank routing information 1109.

Figure 12:
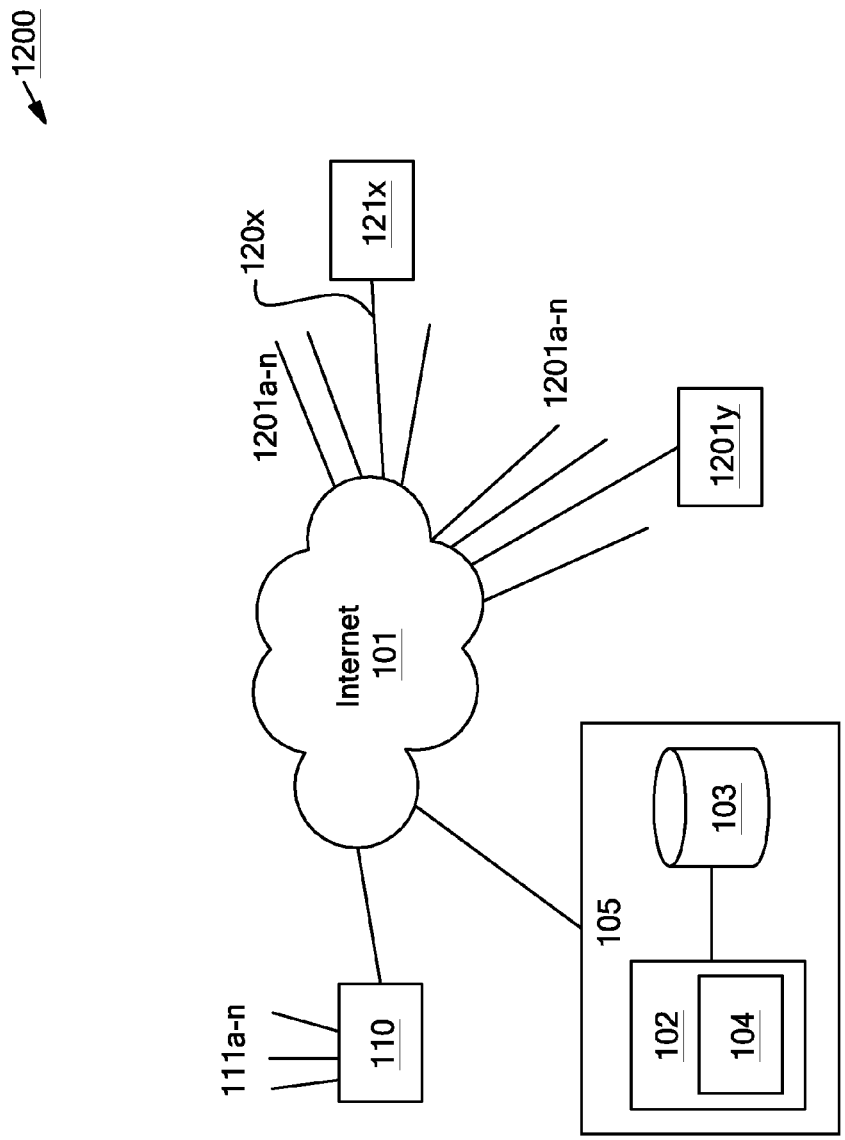
FIG. 12 is a block diagram of an exemplary system according to one embodiment of the present disclosure.

FIG. 12 shows an overview of an exemplary system 1200 according to one embodiment of the present disclosure. Similar to system 100 shown in FIG. 1, system 1200 includes an electronic service provider 110 and a corporate site 105 both connected to the Internet 101. In addition, the exemplary system 1200 provides a lockbox service at the corporate site 105, using server 102, data repository 103, and software set 104. In various embodiments, the lockbox service that receives checks for many companies, opens the mail, processes the checks, deposits the money into the accounts, and creates a file that can then be used by the accounting department of the lockbox service client, the lockbox customer. The system 1200 assigns the correct lockbox customer ID. Additional software modules may be present (not shown) at site 105. FIG. 12 also shows connections 120a-n for lockbox service customer sites (only 121x is shown) and connections 1201a-n for payor sites (only 1201y is shown). The payors are the end customers of the lockbox service customers.

Figure 13:
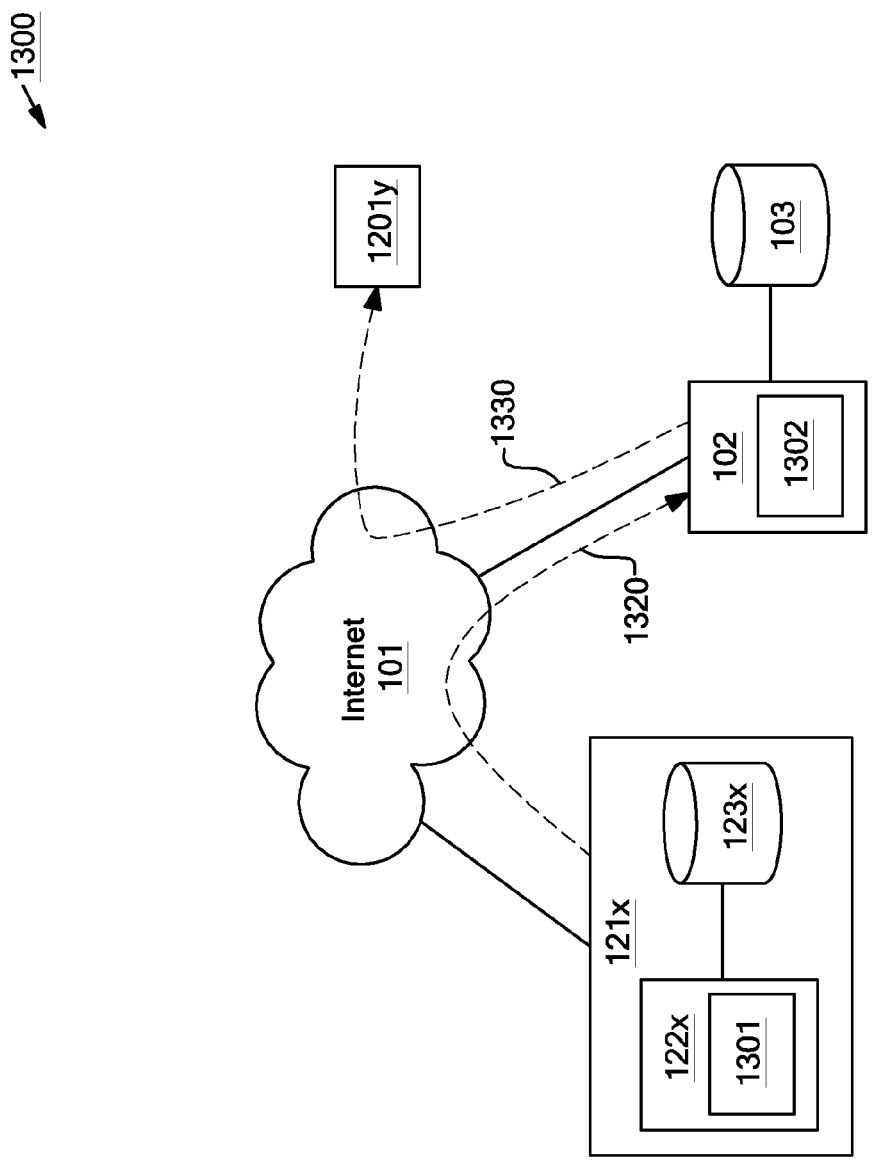
FIG. 13 is a block diagram of an exemplary billing system according to one embodiment of the present disclosure.

FIG. 13 shows an overview of an exemplary billing system 1300 according to one embodiment of the present disclosure. The lockbox customer at site 121x issues an invoice from system 122x, which has data repository 123x and an exemplary instance of billing software 1301. In some cases, software 1301 may be standard billing software, of any of the types that are commonly used. In other cases, software 1301 may be a web-based billing software or some other type of software. In some cases, the invoice may be issued directly from the customer's system 121x to the payor's system 1201y, transmitted by postal mailing of a printed copy or by emailing an electronic copy. In other cases, the billing information may be passed to the lockbox system 102, where it is processed and sent to the payor 1201y as an invoice. As shown by the dotted lines 1320, 1330, the billing information and the invoice may be transmitted electronically through the Internet 101.

In both cases, the payor number and the invoice number are made unique among the payors, the invoices, and/or payor/invoice combinations. For example, if two lockbox customers issue invoices to a same payor, the payor numbers on the two invoices may be different from each other. In some cases a unique number may be generated by lockbox operator system 102, in conjunction with data repository 103 and software 1302. Generating a unique number may be implemented as appending a unique prefix to a standard payor number and invoice number issued by customer software 1301. In some cases, the system 1300 provides a plug-in for software 1301 that can communicate with lockbox operator system 102 to download for each transaction the required information to generate unique numbers.

Figure 14:
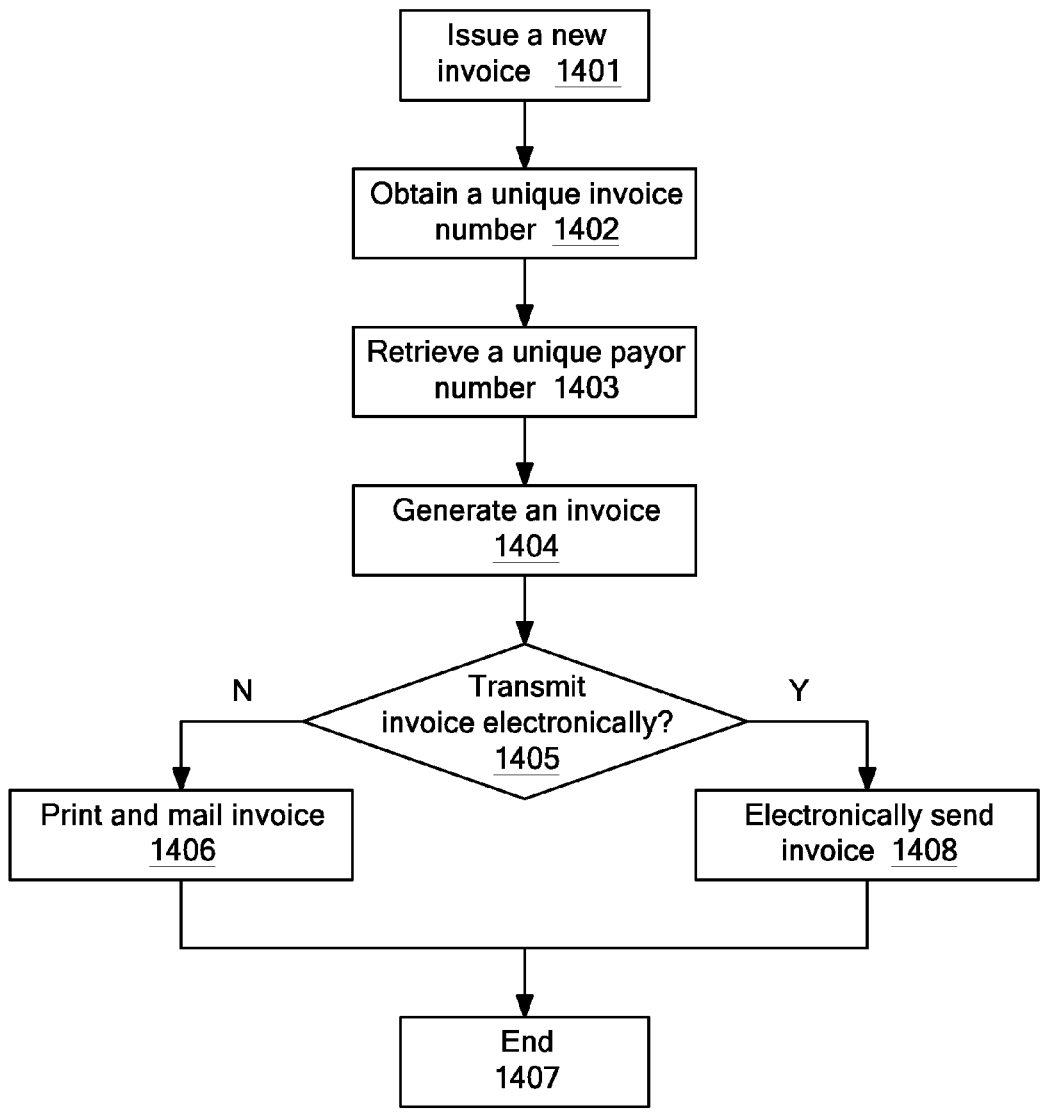
FIG. 14 is a flow diagram of an exemplary process for preparing a billing transaction according to one embodiment of the present disclosure.

FIG. 14 shows an exemplary process 1400 for preparing a billing transaction according to one embodiment of the present disclosure. In step 1401a lockbox customer issues a new invoice to the system 1300. In step 1402 the system 1300 obtains a unique invoice number for the invoice, either from the local system 122x or from the main system 102 and data repository 103. In step 1403 the system retrieves a unique payor number. If necessary, the system generates a new unique payor number for a new payor or for existing payors that do not yet have a unique payor number (e.g., for a new lockbox customer). Alternatively or additionally, the system could create a unique identifier for each payee, payor, or payee/payor combination. This unique identifier can be a combination of a generic post office box plus a code or mail stop that is unique to the payee, payor, or payee/payor combination. In step 1404 the system 1300 generates an invoice, e.g., using process 700 as shown in FIG. 7. In step 1405 the process branches. If the invoice is not transmitted to the payor electronically (no branch), in step 1406 the system prints the invoice for postal mailing and the process terminates at step 1407. If the invoice is transmitted to the payor electronically (yes branch), in step 1408 the system transmits the invoice to the payor in a suitable electronic document file (EDF) format (e.g., PDF) and then the process ends at step 1407.

Figure 15:
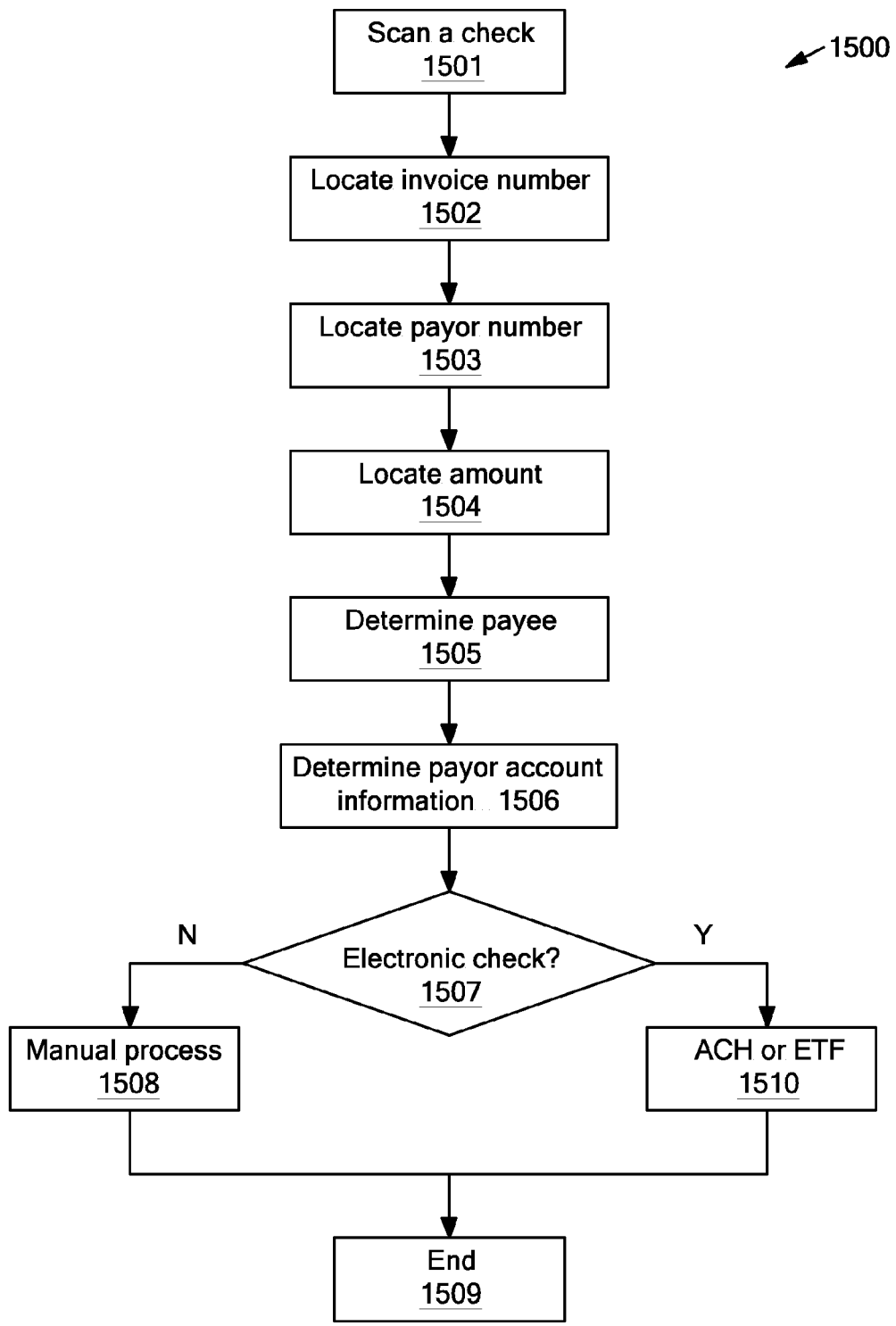
FIG. 15 is a flow diagram of an exemplary process for processing checks received from payors according to one embodiment of the present disclosure.

FIG. 15 shows an exemplary process 1500 for processing checks received from payors according to one embodiment of the present disclosure. In step 1501a received check is scanned. In step 1502 the system locates the unique invoice number on the scanned check. In some cases, this process can be aided by having a unique signature (for example, a prefix "555" or similar) that allows the system to identify the unique invoice number more readily. In some cases the system utilizes a process similar to the one described above in FIGS. 3 and 4 to locate data in the scanned check. In step 1503 the system likewise locates the unique payor number on the scanned check. In most cases, the system needs only one of these two numbers to identify the correct lockbox customer account to deposit the check and/or to credit the correct payor account for the payment. For example, even if two lockbox customers are both depositing payments from the same payor, the system has assigned two different unique payor numbers to the payor for the two invoice payments. Therefore, the system 1300 can correctly deposit the two checks to the two lockbox customers' accounts respectively and credit the payor's two accounts for the two payments accordingly. In step 1504 the system finds the paid amount on the scanned check. Based on the information obtained from the scanned check, in step 1505 the system accesses data in data repository 103 to determine which lockbox customer is the payee. In step 1506 the system finds the lockbox customer's account information and access codes. In step 1507 the process branches based on whether the check is an electronic check. If the check is not an electronic check (no branch), in step 1508 the paper check is sent to a lockbox staff to manually processes the check, and the process terminates at step 1509. If the check is an electronic check (yes branch), the process moves to step 1510, where the system executes an ACH or EFT transaction to deposit the electronic check, and the process terminates at step 1509.

If neither the invoice number nor the payor number is available when the payment is being processed, the system could use one or more of the following approaches to resolving the payment. For example, the system could provide an exception handling user interface (UI). In this UI, a user (e.g., the payor, the payee, a lockbox staff) could look up all outstanding invoices across all companies using the lockbox service. This lookup would allow searching on any of the fields on the check, including the payor, the amount, or the payee. Another option would be for the system to credit the payment to the payee, but provide an interface for the payor/payee to select the invoice it should be applied to. Alternatively, the system could email the payor/payee to ask which invoice the payment was meant for. And, as another option, an agent could call the payor/payee to determine which invoice the payment was meant for.

Therefore, the described systems and processes efficiently and correctly deposit incoming checks to the correct lockbox clients' accounts, independent of the payor identity and of the accounting software used for issuing invoices.

Enhanced Private Interbank Clearing System

Figure 16A:
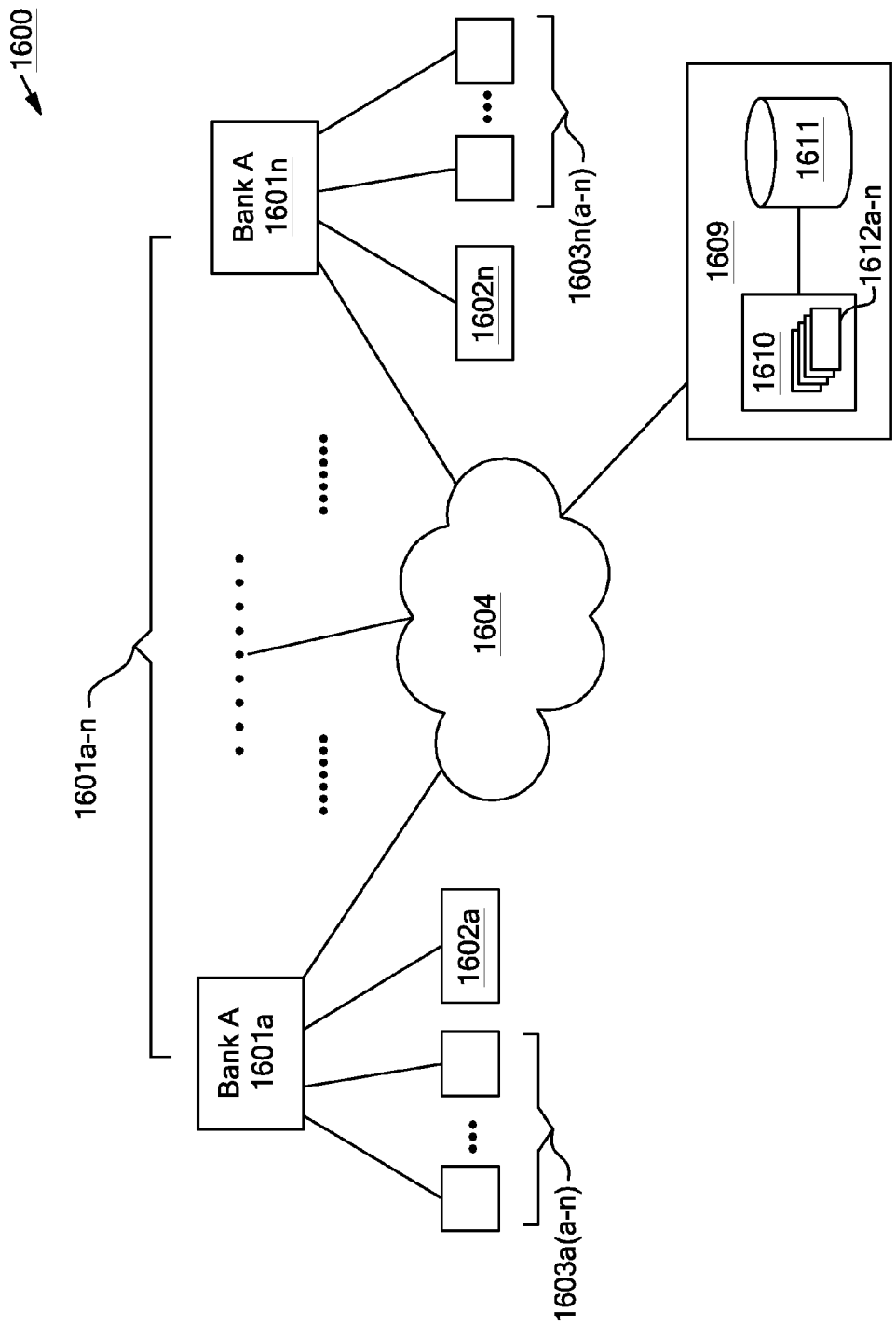
FIGS. 16A and 16B are block diagrams of a system view and an account view of an exemplary system according to one embodiment of the present disclosure.

FIG. 16A shows an overview of an exemplary system 1600 according to one embodiment of the present disclosure. System 1600 includes multiple banks 1601a-n and an interbank clearing system 1609, which has a server 1610, a data repository 1611, and multiple software instances 1612a-n. In some cases the clearing system 1609 is implemented in an electronic payment system (EPS) such as the one shown in FIG. 1. Banks 1601a-n and the clearing system 1609 connect through a network 1604. Network 1604 typically could be the Internet with added security or Virtual Private Networks (VPNs). In other cases network 1604 may be a private network, a wireless network, or a hard-wired network, or any combination thereof. Also shown are exemplary customer and partner accounts 1603a(a-n) of related parties and a clearing entity master account 1602a at the bank 1601a and reciprocal clearing entity master account 1602n and additional customer and partner accounts 1603n(a-n) at bank 1601n.

System 1600 thus permits the making and receiving of payments on the intra-bank host (within a specific bank 1601). Examples of intra-bank transactions include transactions between accounts 1603a(a-n) and 1602a in bank 1601a and, respectively, transactions between accounts 1602n and 1603n(a-n) within bank 1601n. The combination of these two intra-bank host-based transfers enables a transfer from a customer 1603a(a-n) at Bank 1601a to a vendor 1603n(a-n) at bank 1601n to be completed within bank clearing system 1609. Therefore, if a total of all the balances of the master account 1602x and customer and partner accounts 1603x(a-n) in a single bank 1601x is calculated, then to clear the transactions all that needs to be done is to effect a transfer between clearing entity master accounts 1602a-1602n at each of the respective banks 1601a-1601n, in this example, to keep the clearing entity master accounts 1602a-n balanced (within preset boundaries). The transfer needs not be the exactly accurate amount of the difference of the transfers effected at each end, because there may be a base balance, which, in this example, is a base amount in each of the master accounts 1602a-n that is allowed to vary within a certain range.

This approach can be extended not just to two banks, but to dozens, hundreds, or all of the banks in a country or in the world. With a few strategically selected banks, in many cases a vast majority of the transactions can be effected in this way immediately. The balancing transaction between account 1602a and another account 1602x (x within b-n) to keep all the floats in the master accounts 1602a-n in range could be done, for example, just before the end of the day using a wire transfer, to effect immediate transfers between banks. Other similar money transfer mechanisms (e.g., ACH, EFT) may also be used.

Figure 16B:
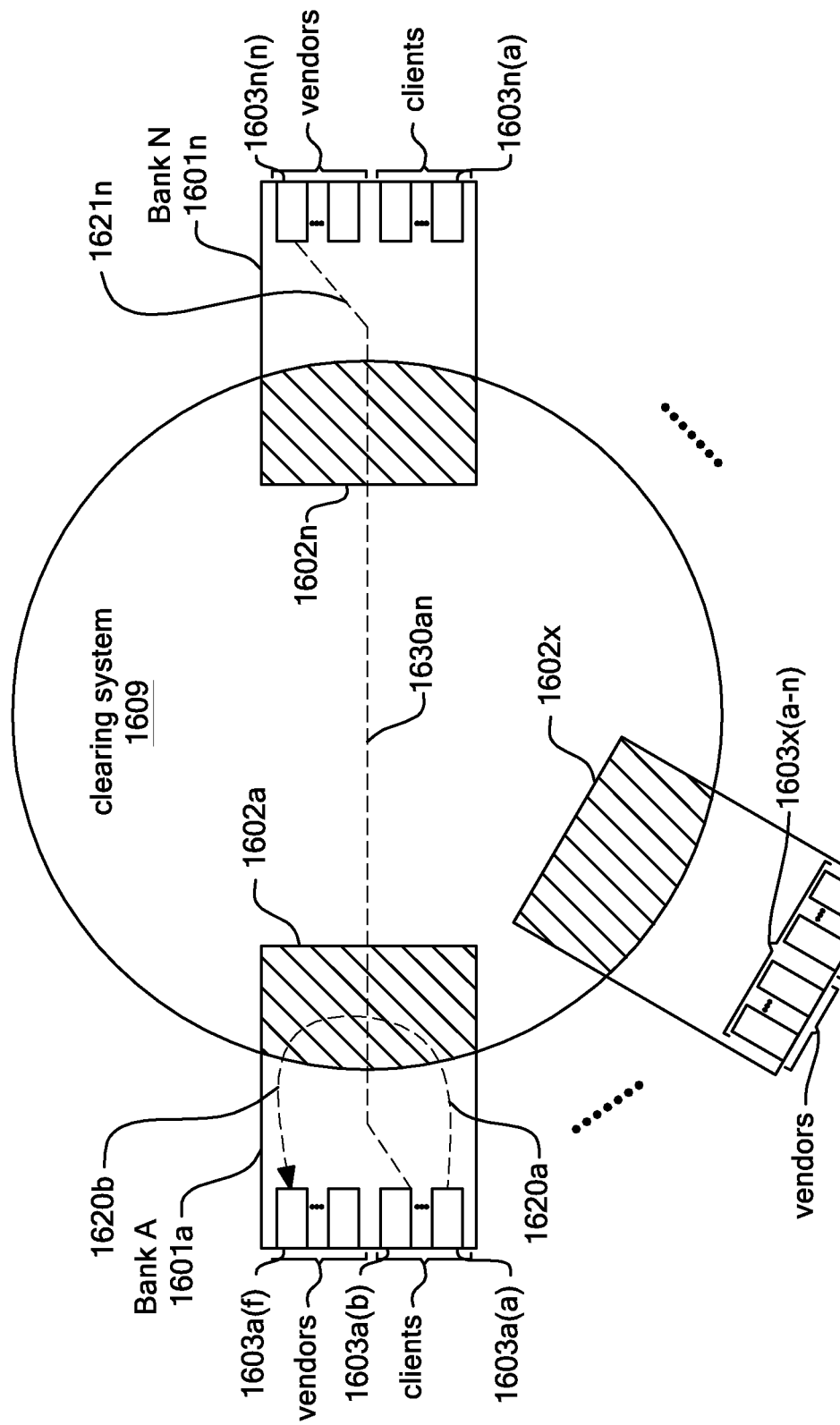

FIG. 16B shows a different view of the same systems, as a view focused on accounts and not a system view. As shown, the clearing system 1609 is represented by a circle and the participating banks are represented by blocks overlapping with the circle. The overlapped portion represents the corresponding clearing entity master accounts 1602a-n. The other bank accounts 1603(a-n) are represented by blocks within the corresponding banks outside the circle.

Making and receiving intra-bank payments directly on a bank's host system enable the transfers to clear immediately (or return a message immediately if funds are not available). Therefore, such intra-bank transactions eliminate the risk to the third-party system for managing payments. In addition, when access to the bank's host is not available, the bank may provide accelerated messages for returns, allowing the ACH transactions to clear in one day rather than the customary two-day period.

In FIG. 16B, for example, a transfer from customer 1603a (a) to vendor 1603a(n) is executed on the intra-bank host of Bank A, from account 1603a(a) to clearing entity master account 1602a as transfer 1620a and then on to vendor account 1603a(n) as transfer 1620b. However, a transfer from customer 1603a(b) (at Bank A) to vendor 1603n(n) (at Bank N) is made as transfer 1621a from account 1603a(b) to master account 1602a (at Bank A) and then as transfer 1621n from master account 1602n to account 1603n(n) (at Bank N). Also shown symbolically is a transfer 1630an, symbolizing the clearing transactions between different master accounts 1602a, and 1602n as needed to rebalance the system.

Figure 17:
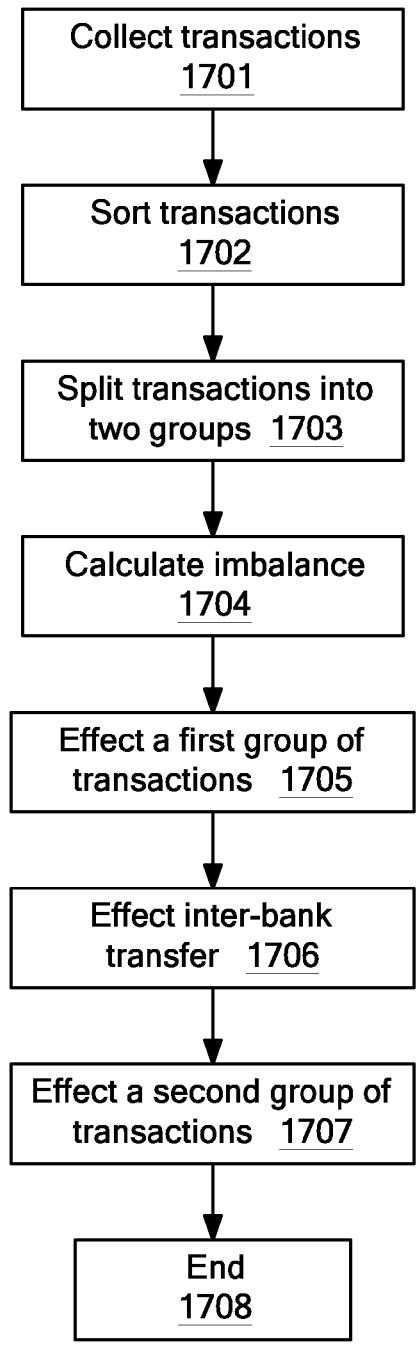
FIG. 17 is a flow diagram of an exemplary process for implementing the system shown in FIGS. 16A-B according to one embodiment of the present disclosure.

FIG. 17 shows an overview of an exemplary process 1700 for implementing the system shown in FIGS. 16A-B according to one embodiment of the present disclosure. In step 1701 all the transactions to be effected are collected from data repository 1611. In step 1702 the transactions are sorted according to their origin and destination ends. Thus, for example, a transaction from one customer account to another partner account (between accounts 103a(a-n)) within the same bank do not have to be taken into account in calculating the clearance between master accounts 1602a-n.

In step 1703 the system splits the sorted transactions into, in this example, intra-bank transaction groups A and B, for each of the banks 1601a-n having pending transactions. Group A contains transactions of money from the respective customer accounts 1603x(x) into the master account 1602x; and group B from the master account 1602y into the receiving partner account 1603y(y). By splitting the transactions into two groups, the transactions transferring money to the master accounts can be effected first. In some cases, for all transactions where the initial transfer from customer accounts 1603x (x) to master account 1602x was successful, and where the master account balance 1602y supports it, the funds can be transferred immediately to customer accounts 1603y(y).

In step 1704 the imbalance among the master accounts at all the participating banks can be calculated. In step 1705 the transactions in group A are effected, and in step 1706 the interbank wire is effected. In step 1707, after verifying that the interbank wire has been received, a transaction for group B (those accounts where the master account balance 1602$y$ did not support the second transfer in step 1703) is effected. Depending on the timing of the interbank wire, transaction group B may be executed on the next business day. Intra-bank (host) transactions such as those of groups A and B may be done after close of business. However, the interbank wire used in step 1706 is only available at a specific hour. The process ends at step 1708.

It is clear that many modifications and variations of this embodiment may be made by one skilled in the art without departing from the spirit of the novel art of this present disclosure. For example, instead of having two transaction groups, more groups or just a single group can be defined, with the latter option of one group especially suitable in cases where the balance is sufficient. Additionally, the system could analyze the money flow among banks, based on a daily, weekly, and quarterly pattern, and other suitable factors, including but not limited to holidays, weather, economic indicators, stock market indicators, and hence calculate which amounts must be exchanged and which amounts can be taken out of balances, knowing that there is a high likelihood of the balances being replenished in the next few days. Thus this technique can reduce the amount of wire transactions. Also, in another case, a super-master account may be established as a single hub to clear multiple master accounts, or, in other situations, a master account may be established with banks that have their own real-time links to other banks, therefore allowing non-wire transfers among those linked banks in real time. These modifications and variations do not depart from the broader spirit and scope of the present disclosure, and the examples cited here are to be regarded in an illustrative rather than in a restrictive sense.

Therefore, comparing to the conventional approaches, the described systems and processes transfer money between accounts at different banks faster and more cost-effectively.

Enhanced Electronic Anonymized Payment System

Figure 18:
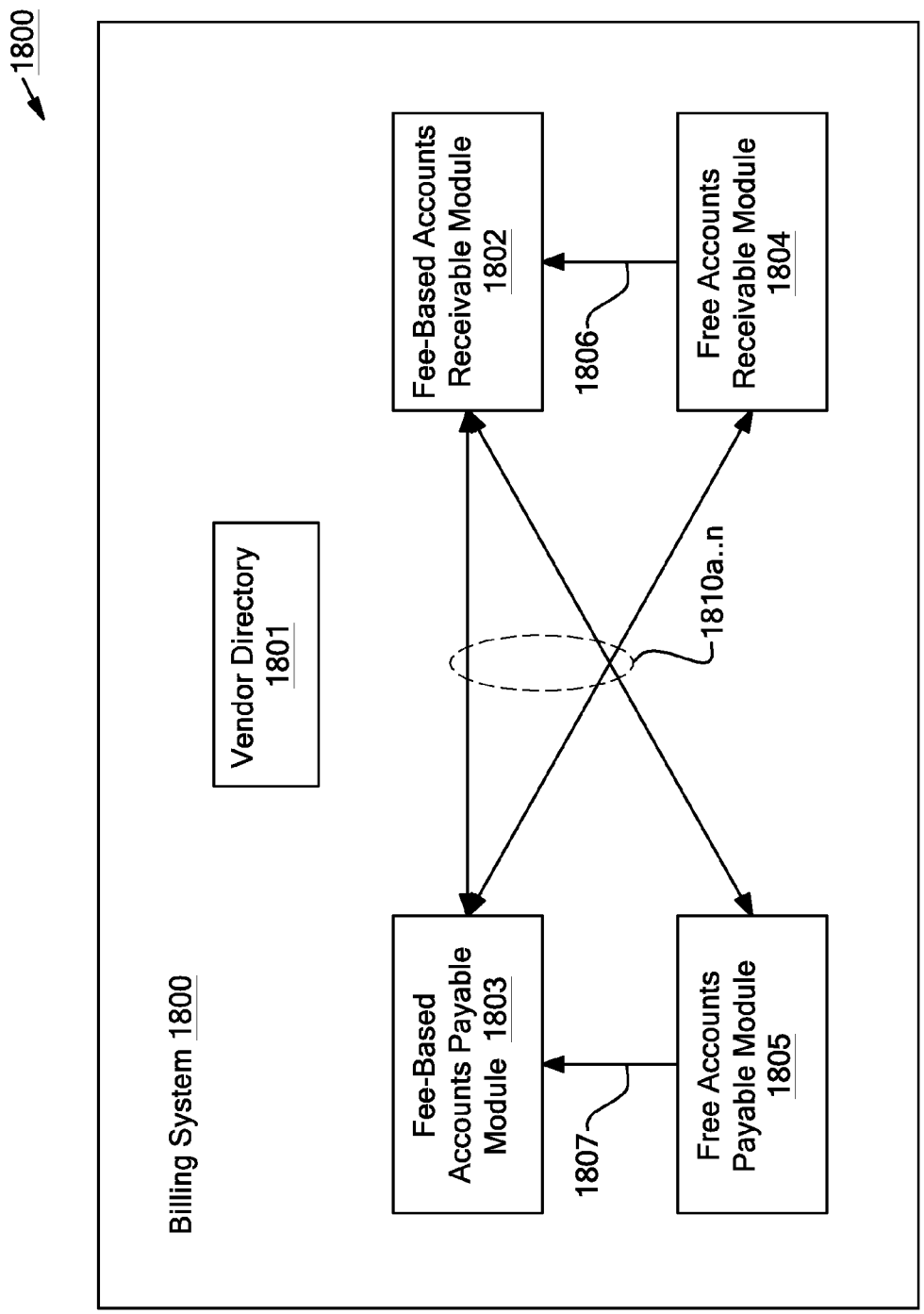
FIG. 18 is a block diagram of a billing and payment system according to one embodiment of the present disclosure.

FIG. 18 shows an overview of an exemplary electronic billing and payment system 1800 according to one embodiment of the present disclosure. As shown, the billing and payment system 1800 includes a vendor directory 1801, a fee-based accounts receivable module 1802, a free accounts receivable module 1804, a fee-based accounts payable module 1803, and a free accounts payable module 1805. The fee-based accounts receivable module 1802 provides functions such as synchronizing invoices and payments, sending invoices, inviting customers to the system 1800, web lockbox service, and collaborate. The free accounts receivable module 1804 provides functions such as sign up usability, create/upload invoices, track payments, collaborate, and upgrade to fee-based account receivable accounts. The fee-based accounts payable module 1803 provides functions such as collaborate, accelerate, ePayment, adoption, and mass invite. The free accounts payable module 1805 provides functions such as pay bills, collaborate, and upgrade to fee-based account payable accounts. In general, the services/functions provided by the free modules 1804, 1805 are a limited subset of services/functions provided by the fee-based modules 1802, 1803, accordingly.

Both the fee-based modules 1802, 1803 provide fee-based services to users (e.g., customers and/or vendors) with fee-based accounts. In addition, the system 1800 invites certain customers (e.g., accounts payable) and vendors (e.g., accounts receivables) to use system functions of the free modules 1804, 1805 for free. Also, customers who have a fee-based accounts payable account may have a free private vendor. For clarity, a customer with a fee-based accounts payable account 1803 is called a "paid customer"; a customer with a free accounts payable account 1805 is called a "free customer"; a vendor with a paid accounts receivable account 1802 is called a "paid vendor", and a vendor with a free accounts receivable account 1804 is called a "free vendor".

The vendor directory 1801 allows the system to identify a vendor and thus transfer payments without requiring any specific financial information about this company. The vendor directory 1801 supports additional biller networks and EDI (Electronic Data Interchange) vendors, promotes vendors (e.g., account receivables) to directory, and provides pay to console. In one embodiment, the vendor directory 1801 comprises a database that stores information about vendors and some of the information (e.g., full business name such as "AT&T Wireless" and "AT&T Small Business Services", postal address) is searchable by users. The database may also include information about the customers (e.g., customer's name and mailing address), some of which may be searchable by users. Each of the users (vendors, customers) has a unique ID (also called the network ID) that can be assigned or generated (e.g., by applying cryptographic hash function to information about the user).

A paid customer may pay to its accounts-receivable vendors, using one of the transactions 1810$a$-$n$, either to paid vendors or to free vendors, which the customer may invite its vendor to become, to simplify the process of paying bills. The free vendor gets a free, no-hassle account that allows him to receive payments from existing paid customers. The goal is eventually to encourage the free vendors to become a paid vendor, as indicated by arrow 1806, so the vendor would have the ability to also invoice other parties. When a vendor (also called an account receivable user or AR user) receives a payment through the system 1800, the payment is automatically matched to the appropriate customer and invoice in the vendor's accounting system. Paid vendors can likewise invite new customers to free accounts payable accounts 1805 or work with existing paid customer and receive payments using the system 1800. Similarly, the goal here is to eventually let the free customers become paid customers, as indicated by arrow 1807. In some cases, the electronic billing and payment system 1800 may provide promotions to encourage users to invite not-yet-linked customers or vendors. Unlike typically offered trial accounts, the system 1800 may set no time limit for the limited functionality provided by the free modules 1804, 1805.

By offering enhanced funds flow management, migration into the system 1800 becomes easy. Further, the system 1800 offers plug-ins into popular accounting systems thereby allowing easy integration into a company's operation without disrupting or complicating internal processes. In fact, each user can update its accounting system without even knowing what the other user's accounting system is via the network synchronization. Thus a vendor can easily achieve single site billing, and customers can have the same convenience. Rather than having to log into a myriad of web sites operated by different entities (e.g., vendors, banks, service providers, etc.), all the invoices arrive at one central location and flow from there directly into the company's accounts payable, thus reducing the overhead and time wasted. Also, statements and reconciliations maybe transmitted among the accounts, and on the return path adjustments, credits, discounts, etc., all with much clearer and simpler communication than today's scribble on a copy of an invoice, etc.

Additional system functions may include managed visibility of the payment process. For example, a customer could let a vendor know that he has received a bill, that the bill has been approved, and when it is scheduled for payment, thus offering better transparency of the process. In some cases queries and or complaints may also be routed over the system. However, the customer has control over these transparency features and can decide what features are to become visible to the vendor. Additionally, the system may offer a mutual rating system that could, for example, rate a customer on such characteristics as timeliness of payment, accuracy of disclosed information, follow-through, etc. Because all the data is available, such as billing date, payment terms, and actual payment, as well as whether there were complaints or other issues, a very accurate payment quality can be derived, much more accurate than typical rating agencies can obtain on small or medium enterprises.

It is clear that many modifications and variations of the above-described embodiments may be made by one skilled in the art without departing from the spirit of the novel art of this present disclosure. For example, instead of having two transaction groups, more groups or just a single group can be defined, with the latter option of one group especially suitable in cases where the balance is sufficient. Additionally, the system 1800 could analyze the money flow among banks, based on a daily, weekly, and quarterly pattern, and other suitable factors, including but not limited to holidays, weather, economic indicators, stock market indicators, etc. and hence calculate which amounts must be exchanged and which amounts can be taken out of balances, knowing that there is a high likelihood of the balances being replenished in the next few days. Thus this technique can reduce the amount of wire transactions. Also, in another case, a super-master account may be established as a single hub to clear multiple master accounts, or, in other situations, a master account may be established with banks that have their own real-time link to other banks, therefore allowing non-wire transfers among those linked banks in real time. These modifications and variations do not depart from the broader spirit and scope of the present disclosure, and the examples cited here are to be regarded in an illustrative rather than in a restrictive sense.

Accordingly, in one aspect, the described embodiments provide a system and method that allows two companies to abstract their bank accounts and still exchange money. In another aspect, the described embodiments provide a system and method that allows a vendor or customer to populate and update the data in their customer's or vendor's accounting system from their own accounting system EDI-style. This approach eliminates the need to re-enter data manually, which typically can also increase risks for transcription errors. The vendor/customer may define a permissions mask controlling when and how information is shared during the billing/invoice payment process (e.g., upon the completion of a workflow). For example, one company may choose to propagate data to its vendors informing them that an invoice has been received, that the invoice has been approved for payment, and that the invoice has been paid. A second company may choose, through its permissions mask, to only share the fact that the invoice has been paid, not the interim steps leading to that bill being paid.

In another aspect, the described embodiments provide a system and method that allows synchronization of invoices and payments from vendor to customer, and back (e.g., both ways). In another aspect, the described embodiments provide a system and method that allows vendors and customers to define a permission mask controlling when/how information is shared during the billing/invoice payment process. In another aspect, the described embodiments provide a system and method that allows both vendors and customers to have a unique network ID in a master directory independent of regular items, including but not limited to tax ID, email address, corporation number, etc., thus enabling them to link to other companies, and also allowing companies to invite their vendors and customers to create an account which links them to the their customer/vendor in a single step. In another aspect, the described embodiments provide a system and method that allows companies to manage the flow of funds into and out of a single bank account for purposes of making bill payments and collecting on receivables. In another aspect, the described embodiments provide a system and method that allows a company to accept invitations to connect from multiple vendors or customers from within a single system, and also allows users to invite groups of vendors or customers from a database of vendors/customers in a company's accounting system.

Advanced Invitation Process

Figure 19:
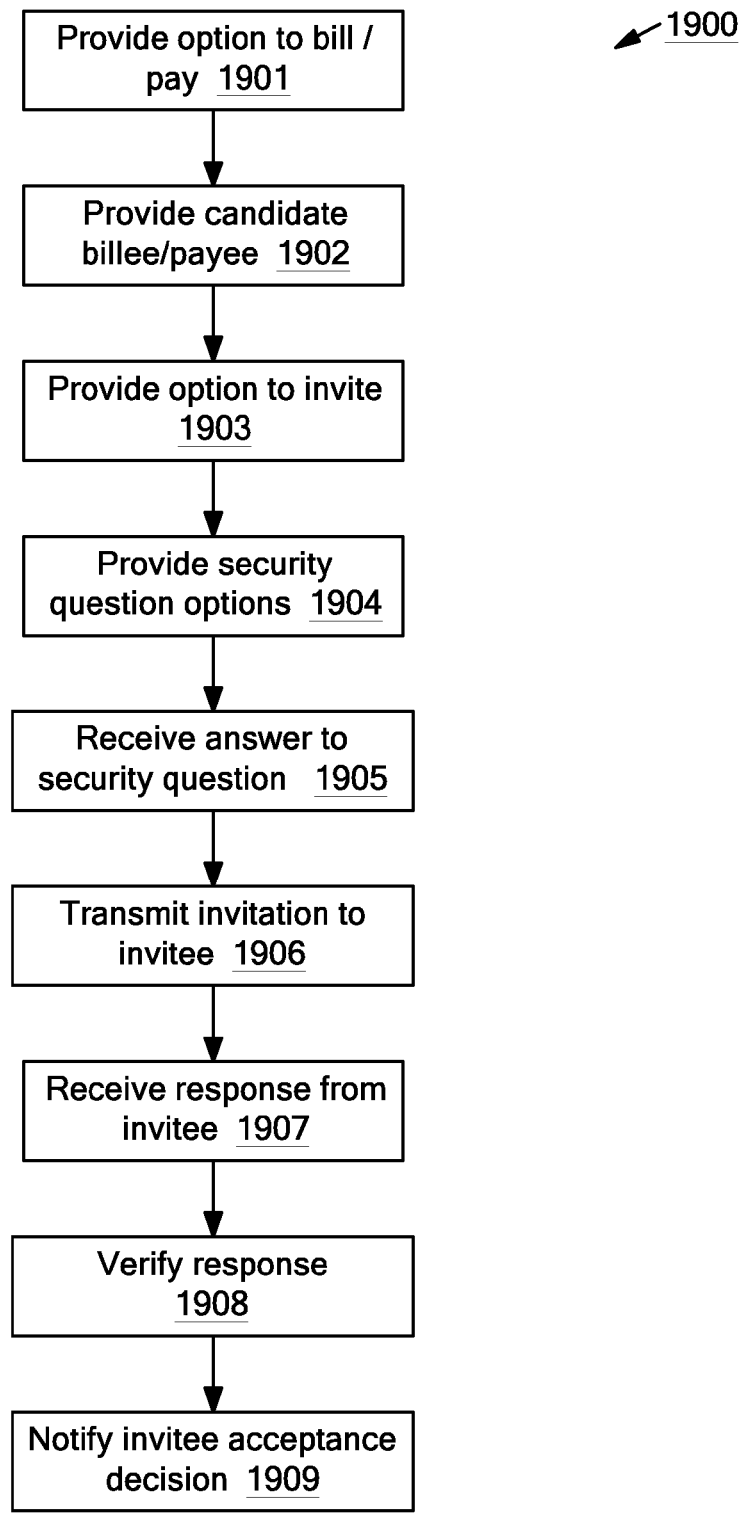
FIG. 19 is a flow diagram of an exemplary process for inviting entities to open accounts at an electronic billing and payment system according to one embodiment of the present disclosure.

FIG. 19 shows an exemplary process 1900 for inviting entities to open accounts at an electronic billing and payment system, according to one embodiment of the present disclosure. The process 1900 may be implemented by an electronic billing and payment system such as the ones showed in the accompanying figures. Each step in the process 1900 may involve retrieving and/or recording information in a data repository such as the data repository 1611 in FIG. 16 and the data repository 103 in FIG. 1.

In step 1901, the system provides a user (hereinafter called an "invitor") multiple various system options including an option to bill (if the invitor is a vendor/accounts receivable) and/or an option to pay (if the invitor is a customer/accounts payable). In step 1902, the system receives from the invitor a user selection of the option to bill/pay, and provides the invitor with a list of candidate billees/payees and/or an option to input a billee/payee. In step 1903, the system receives from the invitor a user selection (or input) of the respective billee or payee, and provides the invitor with various applicable system options including sending the billee/payee an invitation for a free account with the system. In step 1904 the system receives from the invitor a user selection of sending an invitation for a free account to the selected/inputted billee/payee (hereinafter called the "invitee"), and provides the invitor with security question options that the invitee must answer in order to accept the invitation. For an invitee that the invitor knows well, he may draw from a set of standard security questions provided by the system or create a security question about personal information, such as city of birth, name of first pet, name of grammar school, etc. Alternatively, the invitor may draw from a set of standard security questions provided by the system or create a security question about company-related information that only the correct invitee would know, such as, for example, name of manager, last four digits of business telephone number, etc. In step 1905, the system receives from the invitor a user selection (or input) of a security question, along with the "correct" answer that he anticipates from the invitee. The system may then receive from the invitor inputs regarding other billing and/or payment transactions, or repeat steps 1901 through 1905 to invite other entities.

The completion of step 1905 triggers the system to perform step 1906, in which the system creates and transmits an invitation (e.g., an email message) to the invitee. In step 1907, the system receives a response to the invitation (e.g., email or other type of message) including an answer to the selected security question. In step 1908, the system verifies the response by comparing the answer from the invitee against the "correct" answer entered by the invitor. The system can be configured to, either as default or in case of a non-matching response, present the invitee's response to the invitor for further verification. In step 1909, once the response is verified (either by the system or by the invitee), the system notifies the invitee of acceptance (or not) into a free part of the system extended to partners of paying users and the system creates a link between the account of the invitor and the new account of the invitee for the purposes of sharing invoice information, making electronic payments, transmitting remittance information, and maintaining basic information about the invitor and invitee (e.g. the invitee's company name, address, and other contact info). In some cases, the processes of steps 1906 through 1909 may all be carried out via email. In other cases, the initial invitation prepared in step 1906 may contain a link to a secure web site where the system and invitee execute the remaining steps. In some cases, after an invitor has instructed the system to send an invitation, the system may detect that the named invitee has already been activated for service by another customer of the service (or otherwise has an account with the system). In such a case, rather than sending out an invitation, the system asks the invitor to verify the identity of the proposed invitee to ensure that the invitee is indeed the same entity. If so, the invitee is then linked automatically to the invitor for services such as receiving electronic invoices and payment services, or receiving electronic transactions at no cost, etc. During the matching process, in some cases there may be a near match, which then can be confirmed by the user; or the system may ask the user to select from a list of existing active users.

Additional Embodiments for Pre-Populated Check Endorsement Section

Figures 20A, 20B:
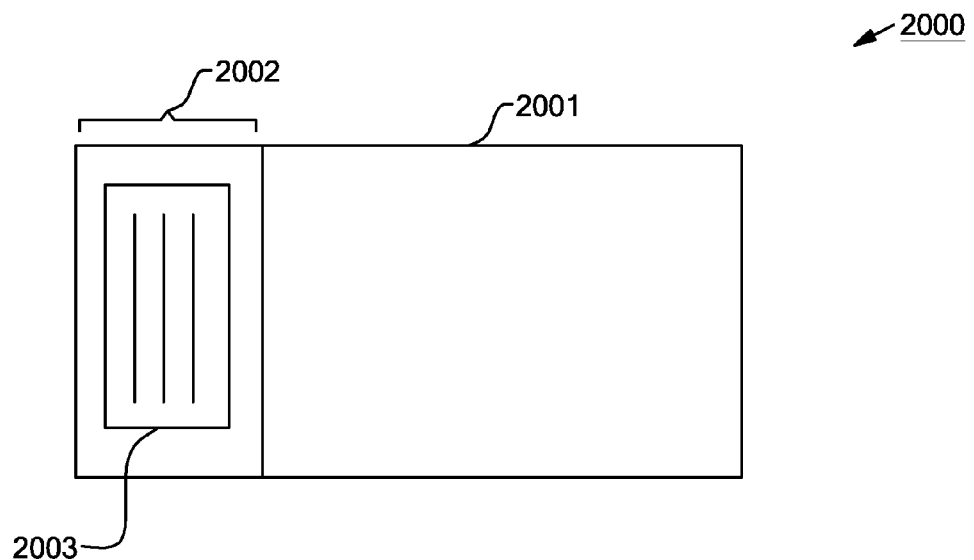
FIGS. 20A and 20B are diagrams of a backside of an exemplary check and an endorsement section of the check according to one embodiment of the present disclosure.

FIGS. 20A-20B shows another embodiment for pre-populating the check endorsement section in addition to the embodiments described in the section titled "Enabling Correct Check and Electronic Payment Deposit", according to one embodiment of the present disclosure. FIG. 20A shows an overview of the back side 2001 of a check 2000. Endorsement section 2002 contains a boxed area 2003. FIG. 20B shows exemplary details of boxed area 2003, according to one embodiment of the present disclosure. Details include a checkbox 2004, which the recipient of the check may check to accept a free service agreement; an ABA number line 2005; an account number line 2006; an email address line 2007; and a printed information line 2008, which may be a reference to a URL (in this example, www.****.com/tc) at which location the user may see the terms and conditions that he accepts when he checks the box 2004. In some cases, a signature may also be requested next to the box, giving permission from the invitee to open an account in his or his company's name.

A billing and payment system creates a check for a user of the system to make a payment to a non-user, and pre-populates the endorsement section as illustrated in FIGS. 20A-20B and described above. Once the non-user cashes the check, the system receives an image of the cashed check and analyzes the filled boxed area 2003 to determine whether the non-user accepted the free service agreement (i.e., checked the checkbox 2004). If the non-user accepted the agreement, the system enrolls the non-user to the free service and sends an email to the non-user to the address the non-user provided in the boxed area 2003.

Map of Trust and Familiarity

Figure 21:
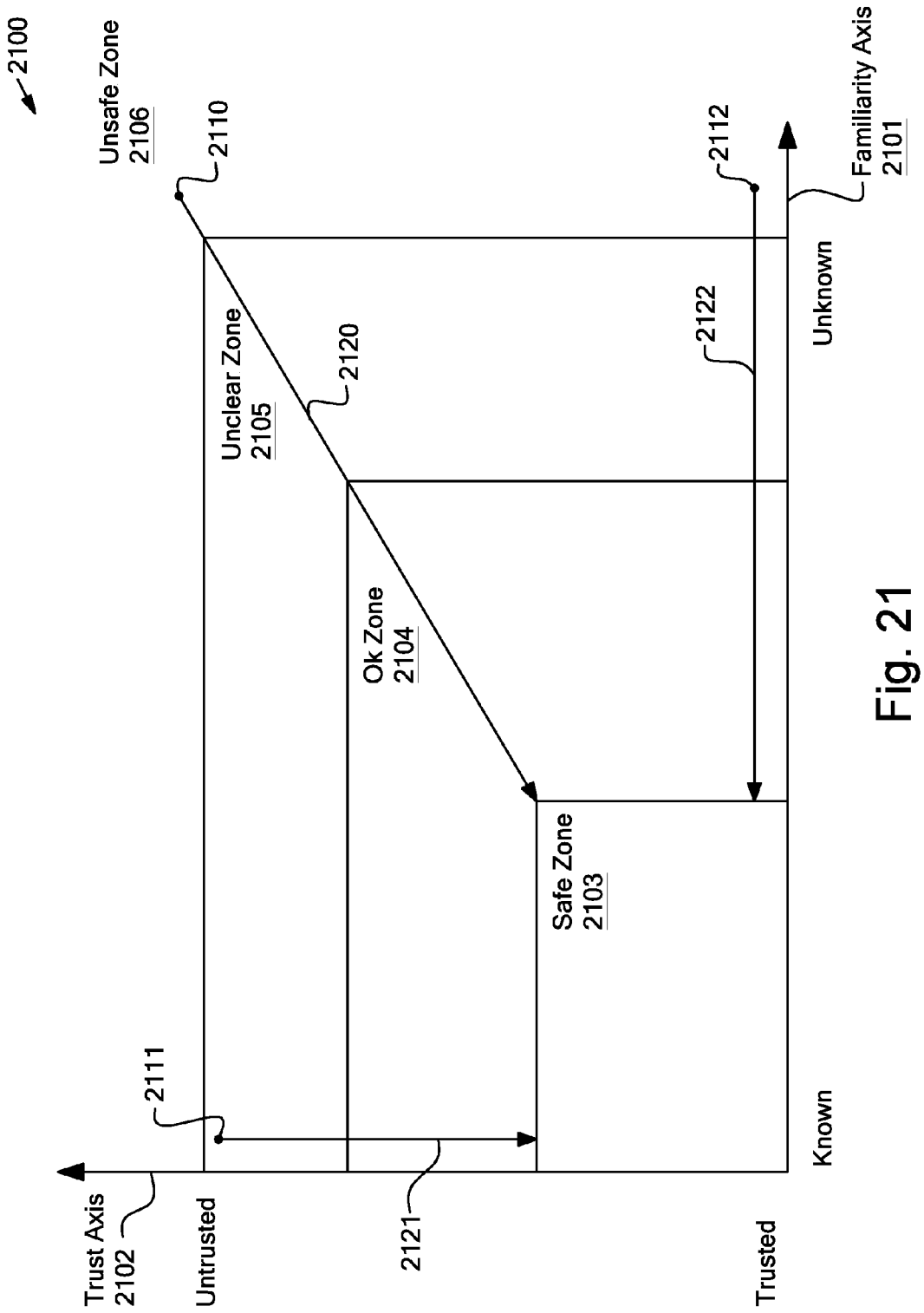
FIG. 21 is a diagram of a map of trust and familiarity for an electronic billing and payment system according to one embodiment of the present disclosure.

FIG. 21 shows an exemplary overview of a map 2100 of trust and familiarity for an electronic billing and payment system, according to one embodiment of the present disclosure. The map 2100 has a familiarity axis 2101 and a trust axis 2102. The axis 2101 shows the range of familiarity (i.e., how much experience the system has with an entity), from known to unknown. The axis 2102 shows the range of trustworthiness, from trusted to untrusted. The familiarity and trustworthiness of an entity (or user) can be determined based on information the entity has provided, and/or the length of time the entity has been making transactions in the system without problems, such as, for example, cancelled checks to provide proof of actual business, uncovered checks providing information about lack of funds or lack of planning, etc. For example, the more positive transactions are recorded for an entity, the more the entity is trusted.

The system has essentially four zones of entity qualifications as illustrated in the map 2100. There is a safe zone 2103, which comprises known and trusted entities. Entities that are less well known and/or less well trusted are in an O.K. zone 2104. Entities whose qualities are unknown, usually because they are new to the system, are in an unclear zone 2105. Everything else beyond those three zones is an unsafe zone 2106. Depending on how the system is configured, new accounts may start in different locations in the map 2100, such as points 2110, 2111, and 2112. As the entities establishes itself to the system, their trustworthiness/familiarity to the system move in the map 2100 along trajectories such as, respectively, 2120, 2121, and 2122, which trajectories may be linear or not, depending on such variables as types of transactions, time periods between transactions, amounts transacted, and hopefully eventually, ending up in the safe zone 2103. For example, if any entity transacts only one or a few transactions of very small amounts, it may not progress beyond the OK zone 2104, because the system does not know if these transactions are only for the purpose of gaining a trusted rating from the system.

In some cases, these trust ratings may be available to customers; in other cases, this data may be available internally only, for internal assessment of transactions. In yet other cases, the data can be made publicly available; thus the system can act as infrastructure or basis for a rating agency. Also, additional information such as timeliness of payment, etc., may be separately rated or considered in the map 2100. Further, based on the receivables side, a company may be rated on the timeliness of payments received from it relative to the due date. Accordingly, a lot of information may be mined from the information derived from behavior of both customers and their partners, but not necessarily all information may be made public (as in available to customers or to the public in general, for example, for a fee), nor is it desirable to make all the information public. Additionally, the system may take into account the referral or recommendation of a particularly trusted party, such as a CPA firm or an accredited bookkeeping firm. Further, these trusted parties themselves may have their ratings going up or down based on their behavior and the behavior of the companies they have recommended.

Secured Document Lockbox System

Figure 22:
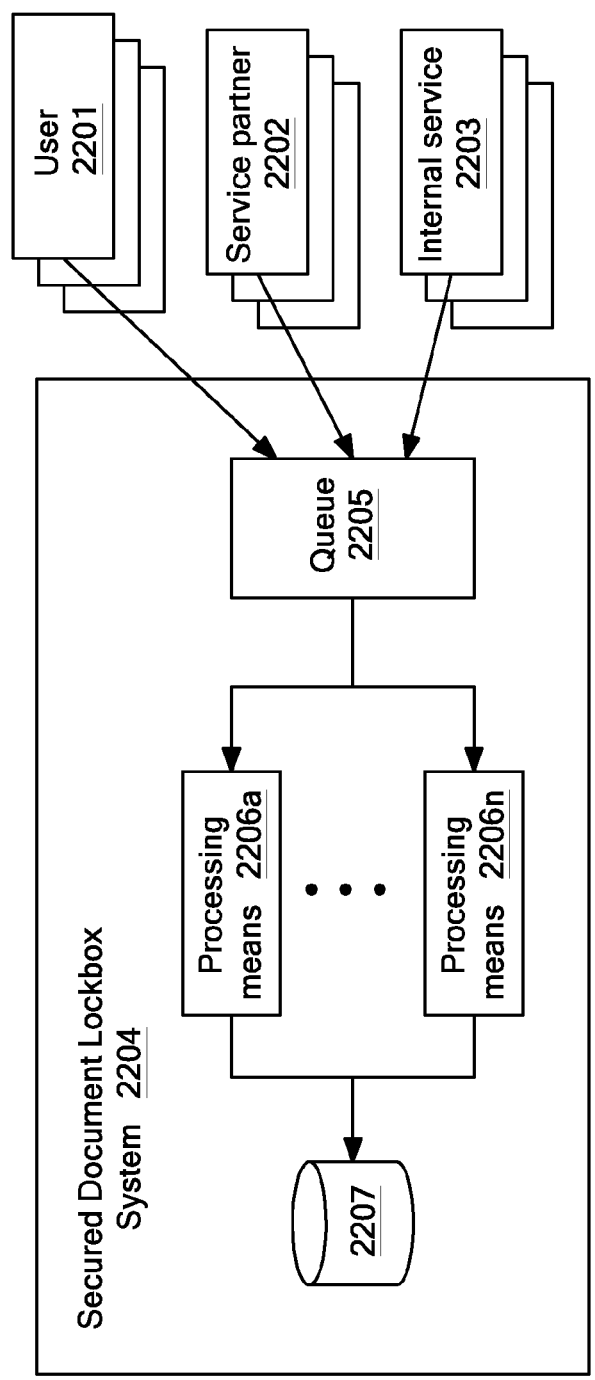
FIG. 22 is a block diagram of a secured document lockbox system according to one embodiment of the present disclosure.

FIG. 22 shows a secured document lockbox system 2204 for invoices and other accounting-related documents, according to one embodiment of the present disclosure. The system 2204 receives documents from sources such as system users 2201 (e.g., customers, vendors), service partners 2202 (e.g., CPAs, accountants, etc.), and internal system services 2203 (e.g., of a billing and payment system). These documents may be scanned and emailed to the system 2204, faxed to the system 2204, or sent as physical paper documents to the system 2204. In some cases, for example, customers 2201 may ask partners 2202 to send their invoices and/or other accounting-related documents to a post office box address of the system 2204.

All received documents are placed in a queue 2205, out of which they are processed by one or more of various means 2206a-n. The queue 2205 allows for efficient and secure document processing by a third party. The system 2204 restricts documents/information made available to processing means 2206 to only those necessary for the processing (and not any other potentially sensitive data in the customer's account), and thereby enables a much more secure process. By allowing the processing to be routed to a single queue, the system 2204 becomes a central resource for working through documents across a number of unique accounts belonging to different companies or organizations. Examples of the processing means 2206 include manual input of printed data by data entry personnel, OCR scanning, and any other similar suitable processing means.

In one embodiment, every document is processed by at least two separate processing means 2206, as an accuracy check. If the two processing results do not match, the document is processed further (e.g., by another processing means 2206) to obtain at least two matching results. When the document is satisfactorily processed, it is stored in a data repository 2207, from which it is then passed back to the corresponding document source, and/or entities needing it. To pass back the processed document, the system 2204 may send a message with the document attached as a secure importable file that could be imported directly into the accounting system of the receiving entity. In some cases, the system 2204 may send the document directly to an online accounting system (not shown), subject to the online accounting system providing the right credentials; while in other cases the system 2204 sends only a notification, telling the entity to go to a secure web site and download the file, in a manner similar to services currently available to banking customers.

Enhanced Interoperability for Heterogeneous Accounting Systems

Software as a Service, or "SAAS", is one example of a server provided transaction processing system. In accordance with the present disclosure, a SAAS-based system for sending bills and payments in conjunction with a third-party accounting system may deploy a downloadable program interface (PI) to configure the third-party accounting system and then send and receive data between the two systems. Alternatively, a communication module between SAAS units, called a CSU, for "Communication SAAS Unit", may be deployed in a server supporting the SAAS based system to configure the third-party accounting system and then send and receive data between the two systems. This data, for example, may include electronic invoices or bills and electronic payment data. Further, the transmitted bills may contain an electronic signature, a line item billing, and/or other transaction-specific meta data, and, based on cash flow needs and outstanding bills, some or all customers may be offered a very substantial time-limited discount for immediate payment. Also, customers may use the line-item billing feature to withhold partial payments for specific issues attributed to specific items.

Figure 23:
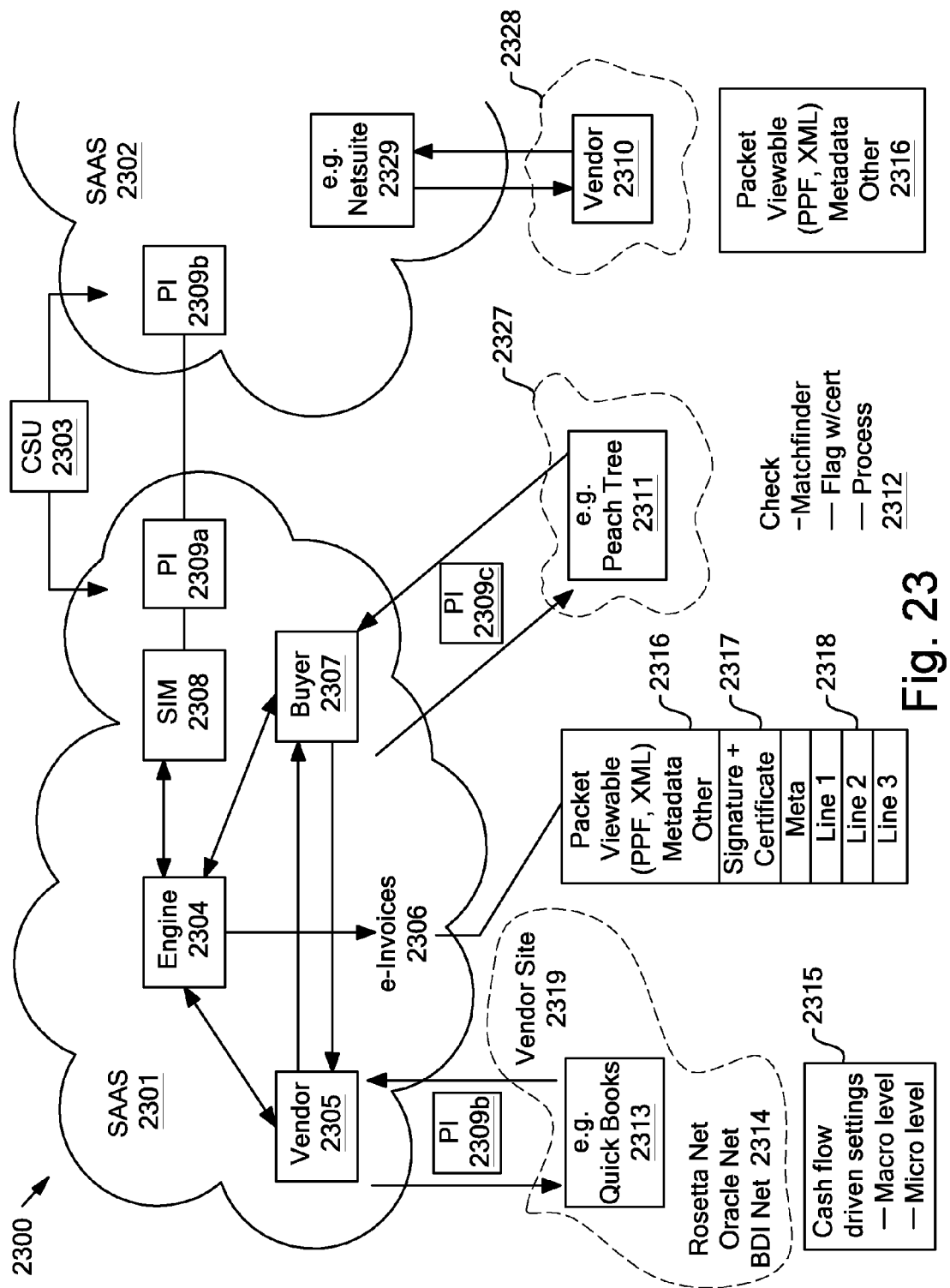
FIG. 23 is a diagram of a cloud implementation of an accounting and payment system according to one aspect of the systems and methods disclosed herein.

FIG. 23 shows an overview of an exemplary cloud implementation of an accounting and payment system 2300, according to one aspect of the systems and methods disclosed herein. Throughout this disclosure, when reference is made to an invoice, the term "invoice" is meant to include "bill", "payment due notice" or any other term used to describe that a transfer of product or funds is needed for work performed, services rendered, product shipped or delivered. Similarly the term "payment" as used herein is exemplary only. Other terms used to describe the other side of a business transaction, such as a shipping remittance, credit memo, vendor credit, etc. are within the scope of meaning of the term "payment" as used herein. SAAS based system, or cloud, 2301 for payment service contains a SAAS engine 2304, a SAAS-based vendor module 2305 and buyer module 2307. These two modules, vendor and buyer, interact with each other through the SAAS engine 2304. At vendor site 2319, accounting system software 2313, such as, for example, Quick Books 2313, is running, as well as an instance of a programming interface (PI) 2309d. PI 2309d preferably automates certain processes and enables direct interface between the local accounting system software 2313 and the SAAS-based vendor module 2305. PI 2309d may be, in some cases, a separate application that requires installation on the vendor's server, or in other cases it may be simply a Java-style or Java Script type application that is downloaded by a web browser as part of a portal page and can interact with the software on a local machine. In addition to Quick Books, other software that can be supported in a similar manner may include Peachtree, Dynamics, MAS90, etc. Further, upon integration of the accounting system software 2313 with the SAAS-based billing and payment system 2301, a vendor can better manage his billing space, not only for actual orders, but also, for example, reaching and implementing cash-flow-based decisions utilizing settings 2315, as discussed below. The cash flow can be driven both on the macro level, for all pending orders, as well as on the micro level, for particular items or customers. These features enable a vendor to send a message, for example, saying that if payment is received in the next 24 hours the buyer will receive a discount, enabling a yield management mechanism for cash flow.

The vendor module 2305 interacts with SAAS payment and billing engine 2304 to send out e-invoices 2306. The invoice contains three main sections (2316, 2317 and 2318). The first section 2316 comprises a packet with a viewable portion and a metadata portion. The metadata portion interfaces with other accounting systems, etc., for example, descriptive of the type of expense, thus facilitating automatic booking after an initial learning. The viewable portion enables users to view and manipulate data, as well as providing more information, in case the metadata is not directly useable for processing. Additional information may also be included in the invoice format, such as, for example, items about payment terms, etc. Further, in some cases, as a second section, an electronic signature 2317 and/or other suitable certificates may be included, to verify the source of and/or the authenticity of the invoice, and a more organized line item metadata set 2318 (third section) also may be included, with more detailed information, including but not limited to type of expense information, item, and even manufacturer's model numbers, etc. This organized metadata form can be used on the receiving side, in this example by the buyer, to set up a format for transfer of data. The first time data is entered, the user sees a prompt from the system on his screen. Once the system learns the data format, the system is set up, and on future invoices it can then automatically transfer information and place it in the correct field in the local accounting software 2311, in this example Peach Tree.

The buyer module 2307 of the SAAS based billing and payment system 2301 interacts with, for example, an instance of Peachtree software 2311 in buyer site 2327 with the help of a programming interface PI 2309c, similar to the one discussed above with respect to the vendor site. In some cases, one PI 2309x may be used for many different local software packages; in other cases, the system may guide the customer to configure or detect his setup, then store the setup parameters in an appropriate location, either locally or in the SAAS-based billing and payment system 2301, and accordingly download the correct setup on the fly. Caching in the browser may also be allowed. The engine 2304 creates all necessary interactions and issues not just invoices, but also checks 2312. The checks may be matched and converted into electronic checks, which e-checks may be flagged if they have a certificate and then processed automatically.

SAAS interaction module (SIM) 2308 has its own programming interface PI 2309a, which can be based either in the SAAS cloud 2301, as PI 2309a, or, as PI 2309b, in the other third-party vendor SAAS cloud 2302, or even on the computer and or browser of the client, in this example vendor 2310, using a SAAS accounting solution from, for example, Netsuite 2329, with, potentially and in some cases, an additional PI 2309b. If a vendor of SAAS accounting services offers appropriate published APIs, a communication module CSU 2303 between SAAS units, may be deployed for direct access, thus not involving the user directly. In such cases, appropriate credentials must then be stored and accessible to the CSU 2303 for transactions.

Figure 24:
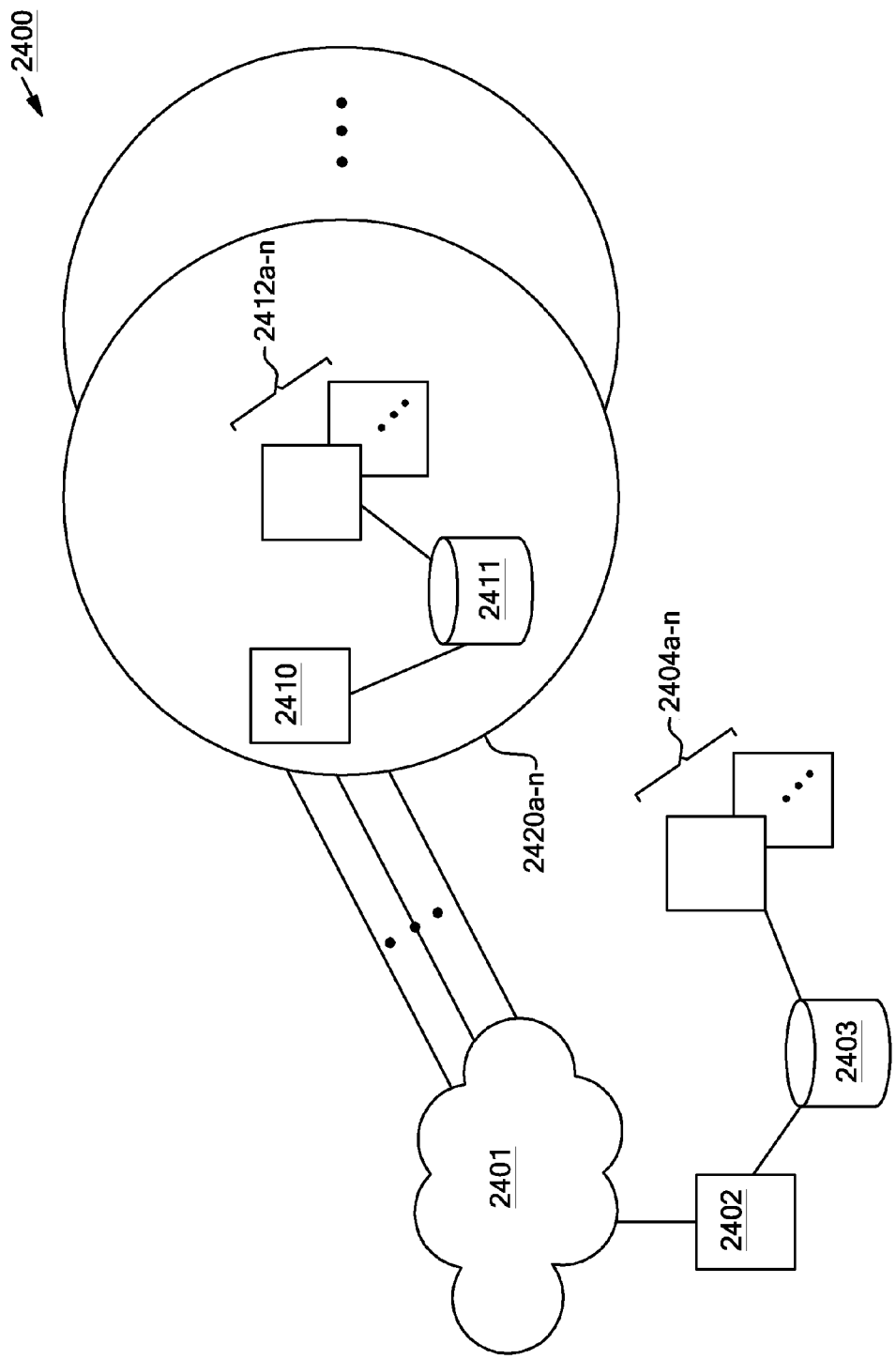
FIG. 24 is a diagram of a system for checking the background of applicants, according to one aspect of the systems and methods disclosed herein.

SAAS cloud 2302, for example, contains a NetSuite instance 2329. The NetSuite customer, in this case the vendor on vendor site 2328, uses a web browser 2310 to interact with the SAAS cloud 2302, and the PI may be installed either on the SAAS-based billing and payment system 2301 side or on the third-party SAAS side (in this example NetSuite; other, similar cloud-based services would function in a similar way). Module SIM 2308 then interfaces directly as described above with a programming interface. In other cases, a complete system exchange interface CSU can be built and can interface directly with published API interfaces of a third-party vendor. Rather than emulating manual functions of creating and sending out invoices and payments, such a complete system exchange interface CSU would enable a full integration of functionality, thus reducing required steps, with attendant time-and-cost savings. FIG. 24 show an overview of an exemplary system 2400, according to one aspect of the systems and methods disclosed herein. Internet 2401 connects to server 2402, on which resides data store 2403, which store may be a disk drive or any of various types of data storage means currently in use. Data store 2403 contains data 2404a-n, which may include, but are not limited to, data objects, data bases, executable programs and drivers, operating system, etc. Also connected to Internet 2401 are customer sites 2420a-n. Each site (not all sites shown) contains at least one computer 2410, with at least one available data store 2411, which data store holds data objects 2412a-n. Each computer 2410 may also have several standard devices and peripherals, including, but not limited to, a keyboard, pointing device, monitor, audio input and output devices, etc., all not shown here for clarity.

Enhanced Business to Business Information

Figure 25:
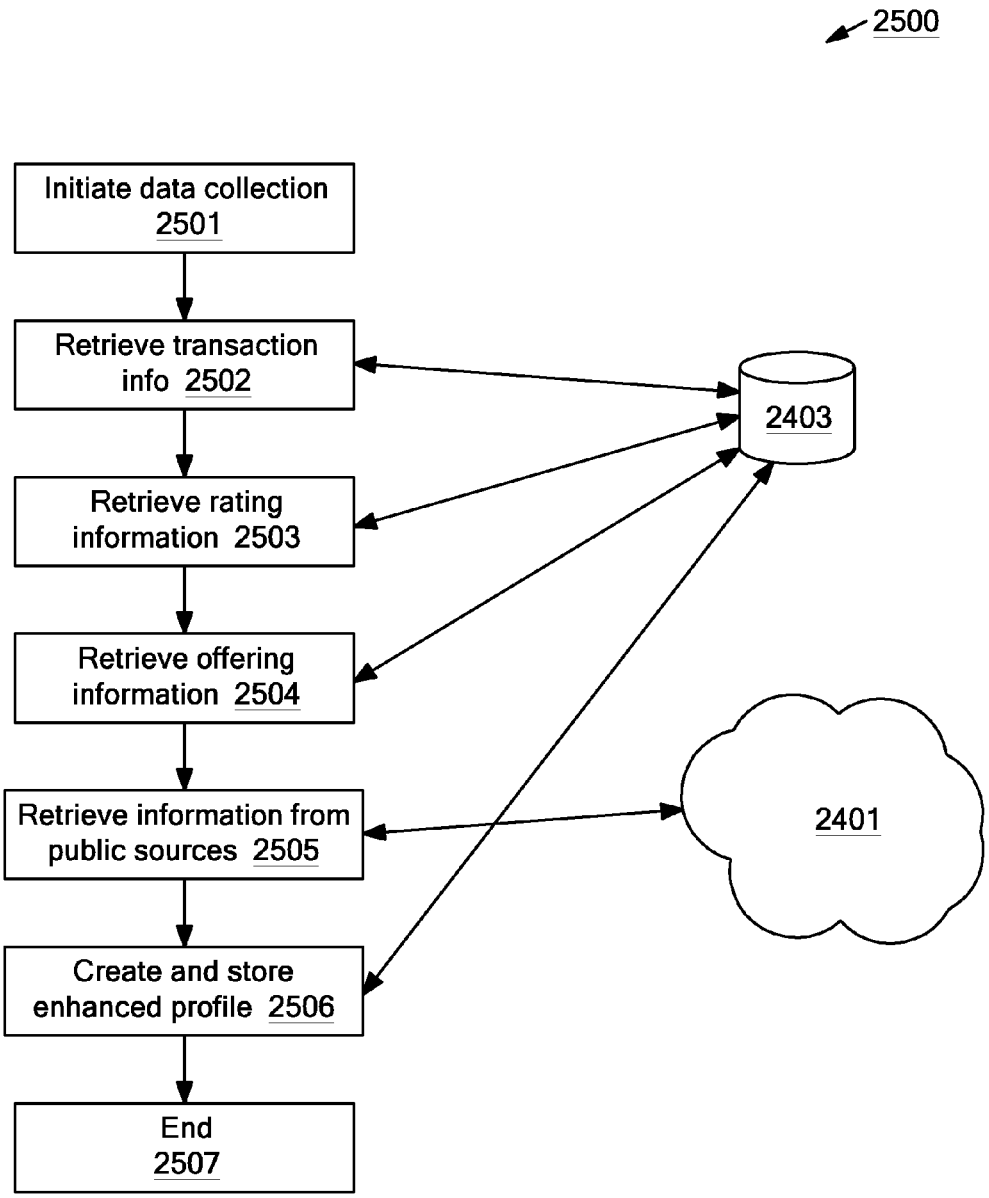
FIG. 25 is a flow diagram of a process for collecting and preparing information about applicants, according to one aspect of the systems and methods disclosed herein.

FIG. 25 shows an exemplary process 2500 for collecting and preparing enhanced information relating to businesses according to one aspect of the systems and methods disclosed herein. In step 2501, the system initiates the process. In step 2502, the system retrieves transaction information relating to one or more businesses from the data store 2403. In various embodiments, the transaction information comprises a plurality of transactions between businesses, which could include current and historical transactions relating to:
  payments
  receipts
  accounts payable
  accounts receivable In an embodiment, the transaction information could be retrieved, in whole or in part, from an electronic payment system such as described above. Additionally or alternatively, transaction information could be retrieved from multiple transaction processing systems operated by various service providers.

In step 2503, the system retrieves rating information relating to one or more businesses from the data store 2403. In various embodiments, the rating information comprises a plurality of ratings, each rating comprising a credit rating of one business by another and/or ratings of individual transactions between businesses. Regardless of whether a rating relates to a business as a whole or individual transactions, each rating can reflect an evaluation of the business and/or the transaction, such as, for example,
  timeliness of payment
  accuracy of disclosed information
  follow-through
  quality of service and/or product
  courtesy In an embodiment, the rating information could be retrieved, in whole or in part, from an electronic payment system such as described above. Additionally or alternatively, rating information could be retrieved from multiple transaction processing systems operated by various service providers.

In step 2504 the system retrieves offering information relating to one or more businesses from the data store 2403. In various embodiments, the offering information comprises a plurality of offerings, each offering comprising of a description of an offer that a business is extending to other businesses. Such offerings could include, for example:
  a product offering
  a service offering In an embodiment, the offering information could be retrieved, in whole or in part, from an electronic payment system such as described above. Additionally or alternatively, offering information could be retrieved from multiple transaction processing systems operated by various service providers or, additionally or alternatively, from websites operated or controlled by one or more businesses extending such offers.

In step 2505, the system retrieves additional public information relating to one or more businesses from a plurality of public information sources, for example, information provided via websites publicly accessible over the Internet. Such websites could include, for example:
  a website of a business
  a third-party information service
  a third party rating service,
  a social networking site In an embodiment, the public information could be retrieved from websites utilizing any technique known in the art such as, for example, screen scraping techniques, a data feed, such as an RSS feed, and/or an API. Such publicly accessible websites could represent free websites and/or websites open to the public that require a subscription or membership fee. Additionally or alternatively, public information could be acquired through any other media now known or later to be developed such as, for example, a database distributed on computer readable media, or printed materials from which information could be acquired by, for example, OCR analysis of the printed materials.

In step 2506 the system generates enhanced profiles for one or more businesses based on the collected information which the then system stores in the data store 2403, and in step 2507 the process ends.

In creating enhanced profiles, the system can perform various types of analyses using the collected information that can reveal various patterns, attributes and behaviors of businesses indicate whether a given business would be a good, bad or risky business partner. For example, the system could identify patterns in payment transactions of a business that identify whether a business consistently makes payments of time, is consistently late in making payments, or has only been late on just one or two occasions. In various embodiments, such patterns could be tracked over multiple time frames of shorter or greater length In another example, the system could determine the creditworthiness of businesses and/or individuals that owe a given business money. Such a metric can, for example, indicate how likely it is a given business will be able to pay on time, regardless of past behavior. Similarly, the system could look at the history and current trends of the ratio of the business's receivables and receipts to the business's payables. Such a metric can, for example, indicate a business's credit or creditworthiness is deteriorating if, for example, historically, the business has had higher receivables to payables, but has recently begun to trend to higher payables.

In various embodiments, the profile creation process is executed periodically, for example, once per day. In other embodiments, the profile creation process is executed essentially continuously, for example, in real-time or near time, for example, in response to the creation of new transaction or ratings data. In various embodiments, where information relating to an existing enhanced profile is received, the profile is updated using the new information.

Figure 26:
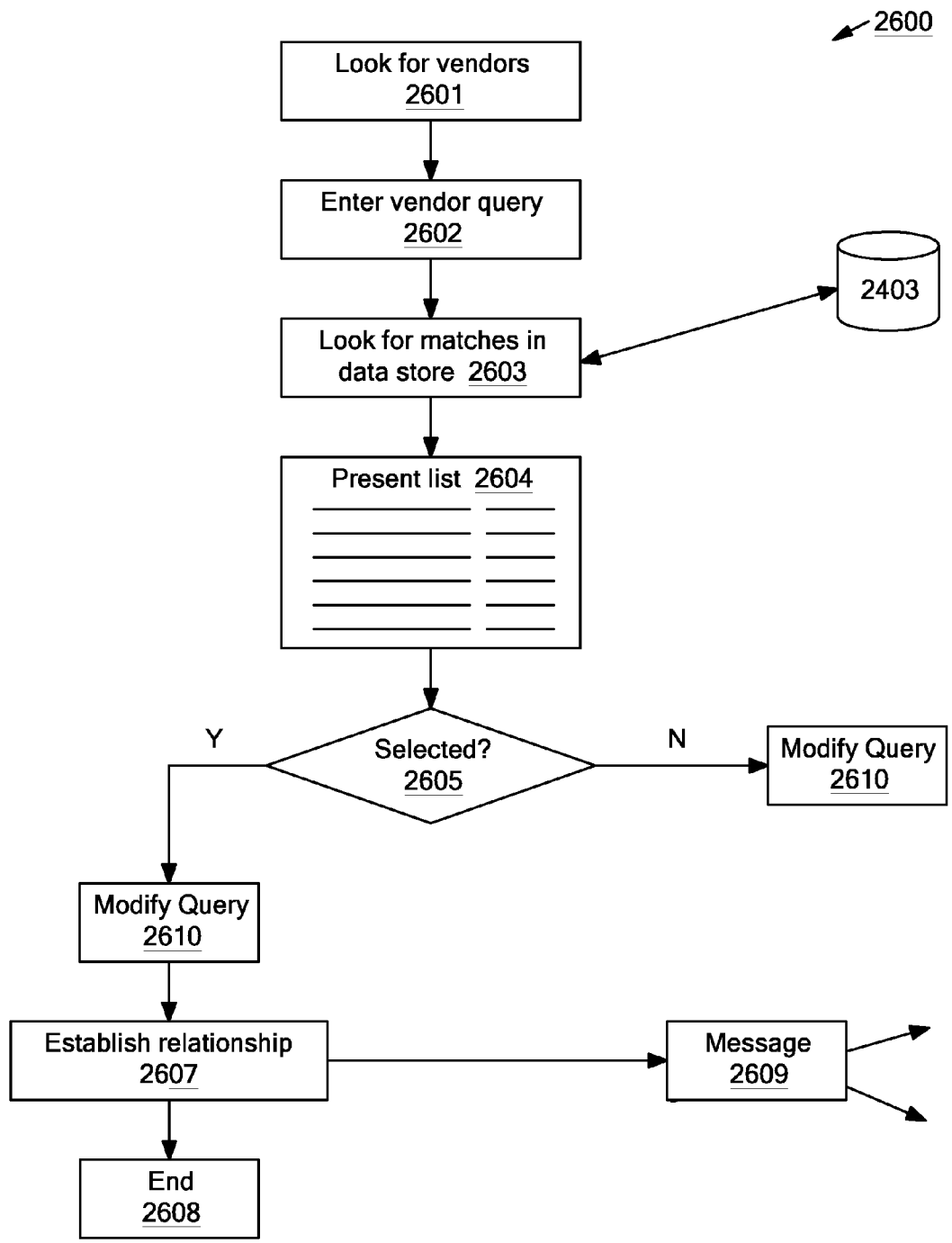
FIG. 26 is a flow diagram of a process by which a user may find suitable partners and go for a bid, according to one aspect of the systems and methods disclosed herein.

FIG. 26 shows an exemplary process 2600 by which an entity, such as a person or a business, may be able, for example, to find suitable partners for a particular business need and establish relationships with such prospective partners according to one aspect of the systems and methods disclosed herein.

In step 2601, a business indicates that it wishes to search for a vendor to fill a specific need. Such an indication could be provided to the system, for example, by the business, over a network such as the Internet, using a user interface provided by systems and methods disclosed herein. The business may have a variety of reasons for seeking such a vendor, for example, the business may be seeking:
 to make or receive a bid for a product and/or service
 to find possibilities to link up financially with existing trade partners, for example, to arrange different than standard payment terms possibly including a third party, such as a partner bank or other financial institutions In step 2602, the business enters the information to be used as a basis for searching for a vendor to fill a specific need. In an embodiment, the business enters a vendor query that comprises one or more vendor selection criteria. In various embodiments, the vendor selection criteria could include one or more of:
 name
 location
 products and services
 specific offerings
 credit rating by other businesses, including ratings relating to payment, accuracy of disclosed information, follow-through and courtesy
 credit rating on individual business transactions, including ratings relating to payment, accuracy of disclosed information, follow-through and courtesy
 patterns of payment
 history and current trends of the ratio of the business's receivables and receipts to the business's payables
 relationships with other businesses
 additional items: shared delivery or shared purchasing to improve conditions and spread risks
 special service level agreements and guarantees In step 2603, the system searches previously prepared results in the data store 2403 for available matches to the vendor search criteria. In various embodiments, such previously prepared results include a plurality of enhanced profiles for a plurality of businesses created as described above with respect to FIG. 25. In various embodiments, the system uses the vendor search criteria to search the data store 2403 so as to identify a subset of the plurality of businesses whose respective enhanced profiles match the vendor search criteria.

In step 2604, the system presents a list of the results of the search performed in 2603 above to the querying business. In various embodiments, the list comprises a plurality of list entries, each list entry providing a representation of respective information relating to one of the subset of businesses identified by the vendor query. In an embodiment, the information relating to a respective business comprises at least a portion of the respective enhanced profile of the respective business.

In various embodiments, the results may be grouped different ways, such as, for example, by businesses with which the querying business has an existing relationship and then by businesses that are new to the querying business. Such groupings can enable the user to compare and contrast existing and new vendors, and also to compare credit rating information from other sources to help in the process of deciding whether to use one or more vendors from the list or search again.

In step 2605, the querying business can decide whether make a selection(s) from the list or search again. If one or more vendors are selected (Yes), in step 2607 the querying business establishes a relationship with the vendor by any of various means, such as email, etc., as indicated in step 2609 and described in greater detail above. In step 2608 the process then ends. If, however, in step 2605, the user does not select any of the vendors in the list presented in step 2604 (No), the user can, in step 2610, modify the vendor query and the process begins again at step 2603. The user can also terminate the process at any step.

Enhanced Verification Through Social Networks

Figure 27:
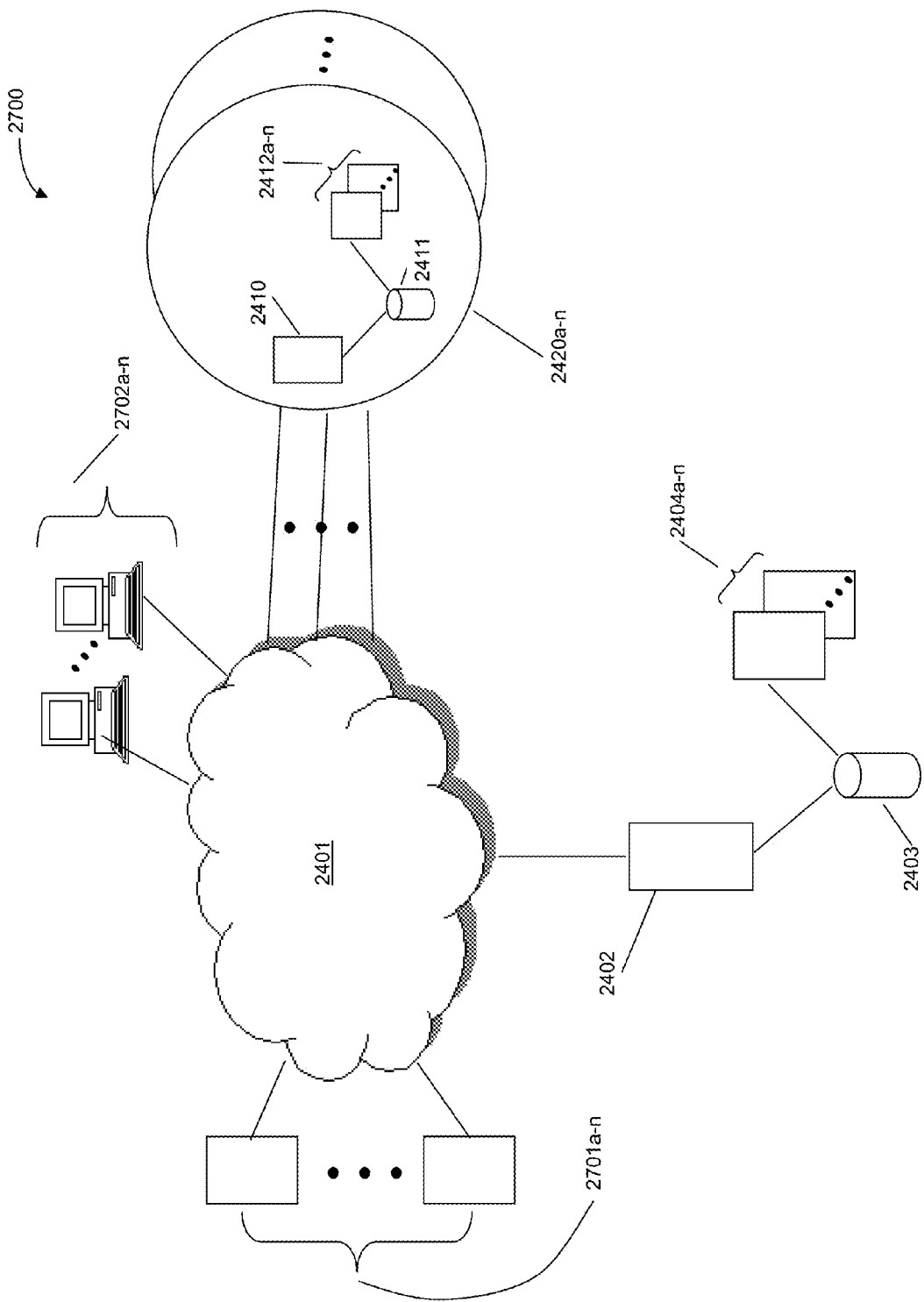
FIG. 27 is a diagram of a system for verifying that a person claiming to represent an entity is indeed representing the claimed entity, instead of being an impostor, according to one aspect of the system and method disclosed herein.

FIG. 27 is a diagram of a system 2700 for verifying that a person claiming to represent an entity is indeed representing the claimed entity utilizing one or more social networks according to one aspect of the system and method disclosed herein.

Various entities, including corporations and individuals, may periodically attempt to register with a system for automated computer processing of invoices, payments, and money transfers as described above. In various embodiments, the registration process is ultimately driven by a person accessing the system from a remote computer via the Internet. A person who is not affiliated with, or authorized by, an entity may attempt to fraudulently register the entity with the system for a variety of fraudulent purposes.

Entities and/or individuals legitimately acting on behalf of entitles may be registered as members with various social networks such as, for example, LINKEDIN, FACEBOOK, and XING.COM. Over the course of conducting business, such social network member accounts typically acquire a number of social connections comprising various relationships with other members. For example, other businesses and/or individuals that conduct business with the entity (e.g. customer or suppliers) may "friend" or "like" the entity.

The term "social network" should be broadly understood to include not only those sites which are commonly deemed to be social networks, such as LINKEDIN, FACEBOOK, but can also include any other social-enabled websites now known, or later to be developed in the art. A "socially-enabled website" should be understood to broadly refer to a website where members of the website can interact with one another and form explicit or implicit social connections. Explicit social connections could include, for example a member's explicit designation of a relationship to another member such as, "friend", "co-worker", "relative", "customer", "like" and/or "follow". Implicit connections could be inferred from a pattern of communication between members, for example, members who exchange a number of messages over a period of time, for example, 10 messages over 6 months, could be regarded as having a social connection.

The various social connections of an entity on a social network can provide an indicator of the reliability and/or creditworthiness of the entity. For example, where business is a friend of, or liked by, a number other entities and/or individuals who have one or more indicators of reliability, the business may be considered to be reliable. Such indicators of reliability could include, for example:

An entity or individual is known to be credit worthy.
An entity or individual is itself "friended" or "liked" by other entities or individuals known to be credit worthy.
An entity or individual has been in business for a number of years.
An entity or individual does not have a criminal record.

Thus, when a user attempts to register an entity and/or individual with a system for automated computer processing of invoices, payments, and money transfers, the system may, as part of an overall process for verifying the registration, request the user to supply the login credentials of social networks of which the entity and/or individual is putatively a member. The system can then evaluate the social graph of such members to assign a rating to the entity or individual that reflects the reliability of the entity or individual. Where the rating fails to meet a predefined threshold, registration can be denied.

This is based on the presumption that where a user is legitimately attempting to register an entity or individual with a system for automated computer processing of invoices, payments, and money transfers, the user will be in possession of the login credentials for legitimate social networking accounts for the entity or individual, and such social networking accounts will reflect a number of social connections with other individuals that have indicia of reliability.

Conversely, if the user is fraudulently attempting to register an entity or individual with a system for automated computer processing of invoices, payments, and money transfers, the presumption is that the user will not present login credentials for social networking accounts or will present login credentials for fraudulent social networking accounts for the entity or individual. It is further presumed that fraudulent social networking accounts for the entity or individual will lack connections to other members with indicia of reliability.

Additionally, or alternatively, it is also presumed that where a user supplies login credentials for more than one social networks (e.g. FACEBOOK, LINKEDIN and TWITTER), that there will be a degree of overlap between the social connections found on the social networks. Thus, in an embodiment, where two social networks are given, and a connection is found with an entity on both networks, the connection may be given a greater weight in determining the reliability of the user.

FIG. 27 presents an exemplary system 2700, in an embodiment, which is similar to system 2400, described above, and incorporates all the elements of system 2400. In addition, the system 2700 is communicatively coupled to third-party social networking sites 2701a-n, for example, without limitation, LINKEDIN, FACEBOOK, XING.COM, and so forth.

A plurality of user computers 2702a-n are operatively connected to the system and to the social networking sites 2701a-n. In an embodiment, could be any type of user computing devices now known in the art or later to be developed such as, for example, a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices.

In an embodiment, the computers 2702a-n are connected through Internet 2401 to a server 2402, on which resides data store 2403, which store may be a disk drive or any of various types of data storage means now known in the art or later to be developed. The data store 2403 contains data 2404a-n, which may include, but are not limited to, data objects, data bases, executable programs and drivers, operating system components, and so forth. In an embodiment, the server 2402 supports a system automated computer processing of invoices, payments, and money transfers as described above.

In an embodiment, various users access the social networking sites 2701a-n via user computers 2702a-n and, inter alia, set up social networking accounts on behalf of an entity. Such social networking accounts may be legitimate (i.e. authorized by the entity), or may be fraudulent. Over the course of time, legitimate social networking accounts on the social networking sites 2701a-n will tend to accumulate social connections to other entities that have at least some indicia of reliability.

In an embodiment, various users access periodically the system for automated computer processing of invoices, payments, and money transfers hosted on the server 2402, via user computers 2702a-n, for the purpose of, inter alia, registering with the system. In an embodiment, the registration process requires users registering an entity or individual with the system to supply login credentials for at least one social networking account for the entity or individual. In an embodiment, the registration process then accesses the social networking sites 2701a-n, retrieves social data for the entity or individual from the applicable social networking sites, and uses the social data to assign a reliability rating to the entity or individual, as described in greater detail above and below with respect to FIG. 28. In an embodiment, entities and individuals having a reliability rating below a threshold are refused registration.

Figure 28:
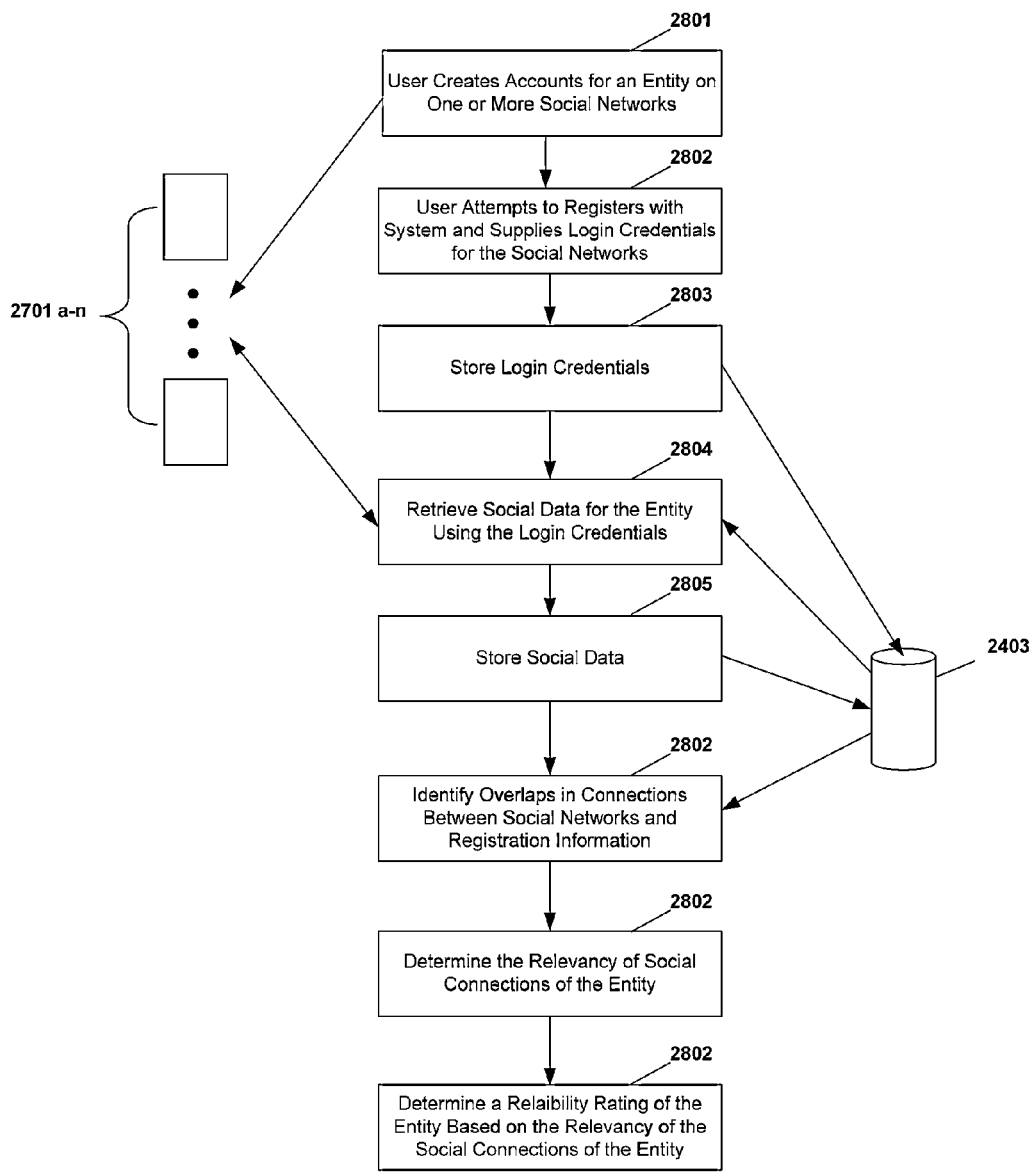
FIG. 28 is a flow diagram of a process for examining the social network affiliations of a person claiming to represent an entity to determine if the person is indeed representing the claimed entity, instead of being an impostor, according to one aspect of the system and method disclosed herein The figures depict embodiments of the present disclosure for purposes of illustration only. One skilled in the art will readily recognize from the following discussion that alternative embodiments of the structures and methods illustrated herein may be employed without departing from the principles of the present disclosure described herein.

For the purposes of the present disclosure social data in the context of this application shall mean any data related to, or derived from interaction networks, public, semi public or private. It shall not be limited to data extracted from social media, but from any data derived from interaction of entities (a "free form" "social connection"), being natural or legal or otherwise, including but not limited to associations, sovereigns etc. This data may be harvested not only from social networking sites, but by tracking entities in any kind of publications, those entities' interactions and aggregating the data obtained in such manner FIG. 28 is a flow diagram of a process for examining the social network affiliations of a person claiming to represent an entity, such as a business or an individual, to determine if the person is indeed representing the claimed entity, instead of being an impostor, according to one aspect of the system and method disclosed herein In step 2801, a user working, for example, on a computing device 2402x, creates one or more member accounts on one or more social networks 2701a-n. In an embodiment, each member account is associated with login credentials known to the user. In an embodiment, each member account purports to represent an entity, which may be a natural person or any kind of legal entity such as a corporation. Such social networking accounts may be legitimate (i.e. authorized by the entity), or may be fraudulent.

In an embodiment, when the user attempts to register a system for automated computer processing of invoices, payments, and money transfers such as described above, the user may be required to supply login credentials 2802 for at least one social networking account of an entity the user purports to represent. In an embodiment, the user is required to supply login credentials 2802 for at least one social networking account of the entity when the user is attempting to access an existing account for the entity with the system. In an embodiment, the user is required to supply login credentials 2802 for at least one social networking account of the entity as part of applying for a higher credit score or some specific feature of the system, such as, for example, faster payment timing.

In an embodiment, during the course of registration or applying for a specific feature of the system, user may supply registration information identifying one other more third-party entities with which the entity has some kind of connection. Such connections could be any type of conventional business connection such as, for example:
 a business reference;
 a personal reference;
 a creditor;
 a debtor;
 a customer;
 a supplier.

In an embodiment, the system stores the login credentials in data store 2403. In an embodiment, the login credentials are heavily encrypted, because such login credentials are favorite targets of hackers. In some cases, the credentials may be stored in a separate data store (not shown), with data store may be protected by additional security features, including, but not limited to, requiring an offsite key for access. Alternatively, in an embodiment, if the entity is linked to the system, such link could provide an alternate way for the system to traverse the network of the subject entity without storing login credentials within the system.

In step 2803, the system, using the login credentials supplied in step 2802, logs in to one or more social networks 2701a-n and downloads social data relating the to entity and its affiliations. In an embodiment, the social data comprises data relating to the entity's social connections with one or other entities on one or more social networks. In step 2804, the system organizes social connection into a manageable format, in an embodiment, into an open database connectivity (ODBC) format. In step 2805, the system stores the reformatted data in the data store 2403.

As noted above, it should be understood that in various embodiments, the process may obtain social data relating to an entity from other online sources that do not, per se, hold themselves out as social networks, or may not be generally regarded as such. One example could be an email account for an entity which may reveal various communications between the entity and other entities. In an embodiment, where there is a threshold number of communications from and to another entity, the other entity could be regarded as a social connection of the entity. Another example could be a website that enables to interact with one another and/or form connections or associations of any type such as, for example, the FLICKR photo sharing websites. In an embodiment, data sources that are secured by a user ID and a password are preferred. In an embodiment, any publicly accessible data source where associations between entities may be referenced, for example, news websites or corporate websites of various entities In step 2806, the system compares overlaps between the information obtained from the various social networks (and other sources, if applicable) and registration information. In an embodiment, where a given social connection is identified in multiple sources, such a social connection may receive a greater weight than social connections identified in a single source. For example, a social connection identified in two social networks may have a greater weight than social connections identified in a single social network. In an embodiment, social connections that do not appear in at least one secured source (e.g. password protected) are discarded. For example, a connection between an entity and a third-party entity referenced in registration information, but not in at least one social network may be discarded.

In step 2807, the system determines a relevancy level of the social connections identified in step 2806.

In an embodiment, a social connection is considered to be relevant if the connection relates to a third-party entity that is determined to be reliable. A third party entity could be determined to be reliable in a number of different ways. In an embodiment, a third-party entity is considered to be reliable if the third-party is known to the system, for example, a third-party that uses the system for billing purposes or provides payments to various entities via the system. In an embodiment, a third-party entity is considered to be reliable if the third-party is known to the system and has various indicia of reliability, for example:
 a good credit rating by other businesses, including ratings relating to payment, accuracy of disclosed information, follow-through and courtesy;
 a good credit rating on individual business transactions, including ratings relating; to payment, accuracy of disclosed information, follow-through and courtesy;
 patterns of payment indicating a history of prompt payment;
 history and current trends of the ratio of the business's receivables and receipts to the business's payables;
 relationships with other businesses;
 additional items: shared delivery or shared purchasing to improve conditions and spread risks; and
 special service level agreements and guarantees.

In various other embodiments, third-party entities could be determined to be reliable using any type of relevant, publicly available information such as, for example:
 a favorable, publicly available credit rating;
 a long history of stable business operations;
 publicly known connections with other businesses that are known to be reliable.

In an embodiment, additionally or alternatively, the system may identify connections that relate to third-party entities that are considered to be unreliable (e.g. a bad credit risk).

In step 2808, the system determines a reliability rating of the entity based the relevancy of the social connections of the entity to third-party entities. In an embodiment, the entity receives a favorable reliability rating where the number of social connections of the entity relating to reliable third party entities meets a threshold number, for example, 5.

In an embodiment, a relevancy factor is calculated comprising a percentage of all of the entity's social connection that relate to a reliable third-party entity, and the entity receives a favorable reliability rating where the number of social connections of the entity relating to reliable third party entities meets a threshold factor, for example, 30 percent or 50 percent.

In an embodiment, the threshold factor varies based on the number of all the entity's social connections. For example, the threshold factor might typically be only 30 or 50 percent for most entities, but since as the number of existing connections for an entity in a social network grows, the percentage of actually verifiable connections plummets. Thus, the threshold factor used will depend on the number of relevant connections; for example, an entity with only 3 to 5 friends would require a 100 percent relevancy factor, while an entity with more than 20,000 friends would probably not be able to reach more than a few percent relevancy factor, but all the matches, if provided, should be found in those 20,000. In an embodiment, a sliding scale for the threshold factor is used, and the range then changes accordingly. In various embodiments, based on experience, the scale may be adjusted from time to time to take new findings into account.

In an embodiment, the weights of relevant social connections, determined as discussed above, could be used in the reliability rating determination. For example, a relevant social connection that is present in two social networks could count as two (or any other number greater than one) relevant connections for the purposes of calculating a relevancy factor for an entity's social connections. In various other embodiments, weights of relevant social connections could be used in the reliability rating determination using any suitable mathematical technique or logical methodology that factors weights of social connections into the determination, as will be readily apparent to those skilled in the art.

In an embodiment, additionally or alternatively, an entity's social connections that relate to third-parties that are considered to be unreliable could be used in the reliability rating determination. For example, the number (or some fraction thereof) of an entity's social connection that relate to third-parties that are considered to be unreliable could be subtracted from the number entity's social connections that relate to third-parties that are considered to be reliable for the purposes of calculating a relevancy factor for an entity's social connections. In various other embodiments, entity's social connections that relate to third-parties that are considered to be unreliable could be used in the reliability rating determination using any suitable mathematical technique or logical methodology that factors unreliable social connections into the determination, as will be readily apparent to those skilled in the art.

In an embodiment, where an entity receives an unfavorable reliability rating, or fails to receive a favorable one, the entity may be denied registration with the system or may be denied access rights to view or modify the options of an existing account with the system. In an embodiment, social connections for entities that are currently registered with the system may be periodically reevaluated to determine such entities' continuing reliability.

It is clear that many modifications and variations of the systems and methods disclosed herein may be made by one skilled in the art without departing from the spirit of the novel art of this present disclosure.

These modifications and variations do not depart from its broader spirit and scope, and the examples cited here are to be regarded in an illustrative rather than a restrictive sense.

For example, in some cases, additional collaboration around the invoices and payments can be provided. This can be in the form of notes that are allowed to go back and forth, be associated with the bills for the long term. They may be displayed as bubbles appearing over or along the invoices and or payments. Further, it should allow a customer to formally dispute all or part of an invoice as part of the system, immediately Further, supporting documents etc. may be attached to invoices and or payments and or disputes, in the form of additional payload information attached as documents, pictures, and other rich information to be associated with the bills. These may be stores in the SAAS Cloud or downloaded to a local machine at the user's location.

Furthermore, stronger notion of a customer or vendor portal for receiving/paying bills or sending/collecting on bills in conjunction with the accounting integration, meta data, additional documents, etc., as well as additional notification channels.

In some cases, a SAAS-based system for sending bills and payments in conjunction with a third-party accounting system may deploy a downloadable program interface to configure the third-party accounting system and then send and receive data between the two systems. Alternatively, a communication module between SAAS units (CSU) may be deployed to configure the third-party accounting system and then send and receive data between the two systems. Further, the transmitted bills may contain an electronic signature, a line item billing, and/or other transaction-specific meta data, and, based on cash flow needs and outstanding bills, some or all customers may be offered a very substantial time-limited discount for immediate payment. Also, customers may use the line-item billing feature to withhold partial payments for specific issues attributed to specific items.

In alternate embodiments, the present disclosure is implemented in computer hardware, firmware, software, and/or combinations thereof. Apparatus of the present disclosure can be implemented in a computer program product tangibly embodied in a non-transitory computer-readable storage device for execution by a programmable processor; and method steps of the present disclosure can be performed by a programmable processor executing a program of instructions to perform functions of the present disclosure by operating on input data and generating output. The present disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method comprising:
   receiving, by a computing device, from a user purporting to act on behalf of an entity, login credentials for at least one website, wherein the at least one website is a social networking website, and the login credentials relate to at least one account on the social networking website that is purported to be an account associated with the entity;
   retrieving, using the computing device, using the login credentials, social data relating to the entity from the at least one website, the social data comprising a plurality of social connections, each of the plurality of social connections reflecting a respective relationship between the entity and a respective third party;
   determining, using the computing device, a plurality of relevant social connections, the plurality of relevant social connections comprising at least a first subset of the plurality of social connections, each social connection of the first subset of the plurality of social connects reflecting a relationship to a respective third party that is deemed to be reliable; and
   determining, using the computing device, a reliability rating of the entity based on the plurality of relevant social connections.

2. The method of claim 1 wherein the at least one website is a plurality of social networking websites, and the login credentials relate to a plurality of accounts on the plurality of social networking websites that are purported to be accounts associated with the entity.

3. The method of claim 1, wherein a respective third party associated with a respective social connection is deemed to be reliable where the respective third party is a member of a financial service.

4. The method of claim 3, wherein the respective third party has further received favorable ratings from other members of the financial service.

5. The method of claim 3, wherein the respective third party has further exhibited a pattern of payment, via the financial service, to other members of the service indicating a history of on time payments.

6. The method of claim 1, wherein the respective third party associated with the respective social connection is deemed to be reliable based on the history and current trends of the ratio of the third party's receivables and receipts to the third party's payables.

7. The method of claim 1, wherein the at least one website is a plurality of websites, the method further comprising:
   identifying, using the computing device, a plurality of overlapping social connections, the plurality of overlapping social connections comprising at least a second subset of the plurality of social connections, wherein each of the second subset of the plurality of connections reflects a respective relationship to a respective third party shared by at least one other social connection of the second subset of the plurality of social connections.

8. The method of claim 7, wherein where a respective social connection of the plurality of relevant social connections is also in the plurality of overlapping social connections, the respective social connection receives an increased weight in determining the reliability rating.

9. The method of claim 1, wherein the reliability rating is based on a number of social connections in the plurality of relevant connections, and the reliability rating is favorable where the number of the social connections exceeds a threshold number.

10. The method of claim 1, wherein the reliability rating is based on percentage of the plurality of social relationships that are in the plurality of relevant social relationships, and the reliability rating is favorable where the percentage exceeds a threshold percentage.

11. The method of claim 10, wherein the threshold percentage is varies based on a number of the plurality of social relationships.

12. The method of claim 10, further comprising:
   receiving, by the computing device, from the user purporting to act on behalf of an entity, a request, the request comprising a request to register the entity with a financial service, the request comprising registration information comprising the login credentials for the at least one website;
   determining, using the computing device, the reliability rating of the entity is one of: favorable and unfavorable;
   in response to determining the reliability rating is favorable, accepting, using the computing device, the request; and
   in response to determining the reliability rating is unfavorable, rejecting, using the computing device, the request.

13. The method of claim 12, wherein the entity is registered with the financial service and the request comprises a request to modify a service option of the service relating to the entity.

14. The method of claim 1, wherein the plurality of relevant social connections additionally comprises at least a second subset of the plurality of social connections, each social connection of the second subset of the plurality of social connects reflecting a relationship to a respective third party that is deemed to be unreliable, wherein in the determining, the reliability rating of the entity based on the plurality of relevant social connections, a respective social connection reflecting a relationship to a third party deemed to be reliable increases the reliability rating and a respective social connection reflecting a relationship to a third party deemed to be unreliable decreases the reliability rating.

15. The method of claim 10, wherein the retrieving the social data, determining the plurality of relevant social connections, and the determining a reliability rating are periodically repeated.

16. The method of claim 1, further comprising:
   storing, by the computing device, the login credentials to a first database in encrypted format; and
   storing, by the computing device, the social data to a second database.

17. A non-transitory computer readable storage media storing thereon computer readable instructions that, when executed by a computing device, cause the computing device to:
   receive, from a user purporting to act on behalf of an entity, login credentials for at least one website, wherein the at least one website is a social networking website, and the login credentials relate to at least one account on the social networking website that is purported to be an account associated with the entity;

retrieve, using the login credentials, social data relating to the entity from the at least one website, the social data comprising a plurality of social connections, each of the plurality of social connections reflecting a respective relationship between the entity and a respective third party;

determine, a plurality of relevant social connections, the plurality of relevant social connections comprising at least a first subset of the plurality of social connections, each social connection of the first subset of the plurality of social connects reflecting a relationship to a respective third party that is deemed to be reliable; and determine a reliability rating of the entity based on the plurality of relevant social connections.

18. A computer system comprising:

at least one processor; and memory storing instructions configured to instruct the at least one processor to:

receive, from a user purporting to act on behalf of an entity, login credentials for at least one website, wherein the at least one website is a social networking website, and the login credentials relate to at least one account on the social networking website that is purported to be an account associated with the entity;

retrieve, using the login credentials, social data relating to the entity from the at least one website, the social data comprising a plurality of social connections, each of the plurality of social connections reflecting a respective relationship between the entity and a respective third party;

determine, a plurality of relevant social connections, the plurality of relevant social connections comprising at least a first subset of the plurality of social connections, each social connection of the first subset of the plurality of social connects reflecting a relationship to a respective third party that is deemed to be reliable; and determine a reliability rating of the entity based on the plurality of relevant social connections.

\* \* \* \* \*